(12) United States Patent
Ise et al.

(10) Patent No.: US 11,990,614 B2
(45) Date of Patent: May 21, 2024

(54) ACTIVE MATERIAL, ELECTRODE, SECONDARY BATTERY, BATTERY PACK, AND VEHICLE

(71) Applicant: KABUSHIKI KAISHA TOSHIBA, Tokyo (JP)

(72) Inventors: Kazuki Ise, Kawasaki (JP); Hirofumi Yasumiishi, Kawasaki (JP); Keigo Hoshina, Yokohama (JP); Yasuhiro Harada, Isehara (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 179 days.

(21) Appl. No.: 17/446,482

(22) Filed: Aug. 31, 2021

(65) Prior Publication Data
US 2022/0302445 A1 Sep. 22, 2022

(30) Foreign Application Priority Data

Mar. 17, 2021 (JP) .................. 2021-043258
Aug. 11, 2021 (JP) .................. 2021-131236

(51) Int. Cl.
*H01M 4/485* (2010.01)
*H01M 4/02* (2006.01)
(Continued)

(52) U.S. Cl.
CPC ....... *H01M 4/485* (2013.01); *H01M 10/0525* (2013.01); *H01M 10/425* (2013.01); *H01M 2004/028* (2013.01); *H01M 2220/20* (2013.01)

(58) Field of Classification Search
CPC ....... H01M 4/36–366; H01M 4/44–48; H01M 4/485; H01M 10/0525; H01M 2004/027;
(Continued)

(56) References Cited

U.S. PATENT DOCUMENTS 10,490,813 B2    11/2019   Harada et al.
2012/0052401 A1   3/2012   Goodenough et al.
(Continued)

FOREIGN PATENT DOCUMENTS

EP    3 121 878 A1    1/2017
JP    2012-99287 A    5/2012
(Continued)

OTHER PUBLICATIONS

Kent J. Griffith, et al., "Unconventional Mechanisms in Niobium Tungsten Oxides for High-rate Lithium-ion Charge Storage," Nature, vol. 559, 2018, pp. 556-563.
(Continued)

*Primary Examiner* — Mayla Gonzalez Ramos
*Assistant Examiner* — Bethany C Garcia
(74) *Attorney, Agent, or Firm* — Oblon, McClelland, Maier & Neustadt, L.L.P.

(57) ABSTRACT

According to one embodiment, provided is an active material including a composite oxide having a tetragonal crystal structure. The composite oxide is represented by general formula $Li_aTi_bNb_{2-2d}M_{c+2d}O_{2b+5+3c}$. Here, M is one selected from the group consisting of W and Mo, $0 \le a \le b+4+3c$, $0 < b < 2-2d$, and $0 < c < 2-4d$.

15 Claims, 12 Drawing Sheets

(51) Int. Cl.
*H01M 10/0525* (2010.01)
*H01M 10/42* (2006.01)
*H01M 4/42* (2006.01)

(58) Field of Classification Search
CPC .......... H01M 2004/028; H01M 4/131; H01M 4/525; H01M 4/505; C01G 33/00; C01G 33/006; C01G 39/00; C01G 39/006; C01G 39/02; C01G 23/04–047; C01G 41/006–02; C01P 2002/72; C01P 2002/74; C01P 2002/76; C01P 2002/80; C01P 2006/40; Y02E 60/10; Y02P 20/133; Y02P 70/50; Y02T 10/70
See application file for complete search history.

(56) References Cited

U.S. PATENT DOCUMENTS

| | | | | |
|---|---|---|---|---|
| 2014/0295231 | A1* | 10/2014 | Ise | H01M 4/366 252/182.1 |
| 2015/0270543 | A1* | 9/2015 | Harada | H01M 4/525 252/182.1 |
| 2015/0364757 | A1 | 12/2015 | Buannic et al. | |
| 2017/0077495 | A1* | 3/2017 | Harada | H01M 50/249 |
| 2020/0251717 | A1* | 8/2020 | Hasegawa | H01M 10/052 |
| 2021/0218075 | A1* | 7/2021 | Grey | H01M 10/0525 |

FOREIGN PATENT DOCUMENTS

| | | |
|---|---|---|
| JP | 2019-52088 A | 4/2019 |
| WO | WO 2014/122376 A2 | 8/2014 |

OTHER PUBLICATIONS

Xiangzhen Zhu, et al., "$MoNb_{12}O_{33}$ as a new anode material for high-capacity, safe, rapid and durable Li+ storage: structural characteristics, electrochemical properties and working mechanisms," Journal of Materials Chemistry A, vol. 7, 2019, pp. 6522-6532

Th. Hahn, "Space-group symmetry," International Tables for Crystallography, vol. A, 2016, 2 pages.

Izumi Nakai, et al., "Chapter 9 Let's use RIETAN-FP," Facts about Powder X-ray Analysis, The Japan Society for Analytical Chemistry, Asakura Publishing Co., Ltd, 2002, 6 pages (with English machine translation).

R. J. Cava, et al., "Lithium Insertion in Wadsley-Roth Phases Based on Niobium Oxide," Journal of The Electrochemical Society, vol. 130, No. 12, Dec. 1983, pp. 2345-2351.

Kent J. Griffith, et al., "Superionic Lithium Intercalation through 2 x 2 $nm^2$ Columns in the Crystallographic Shear Phase $Nb_{18}W_8O_{69}$," Chemical of Materials, vol. 32, 2020, 26 pages.

Jian-Tao Han, et al., "New Anode Framework for Rechargeable Lithium Batteries," Chemistry of Materials, vol. 23, 2011, pp. 2027-2029.

* cited by examiner

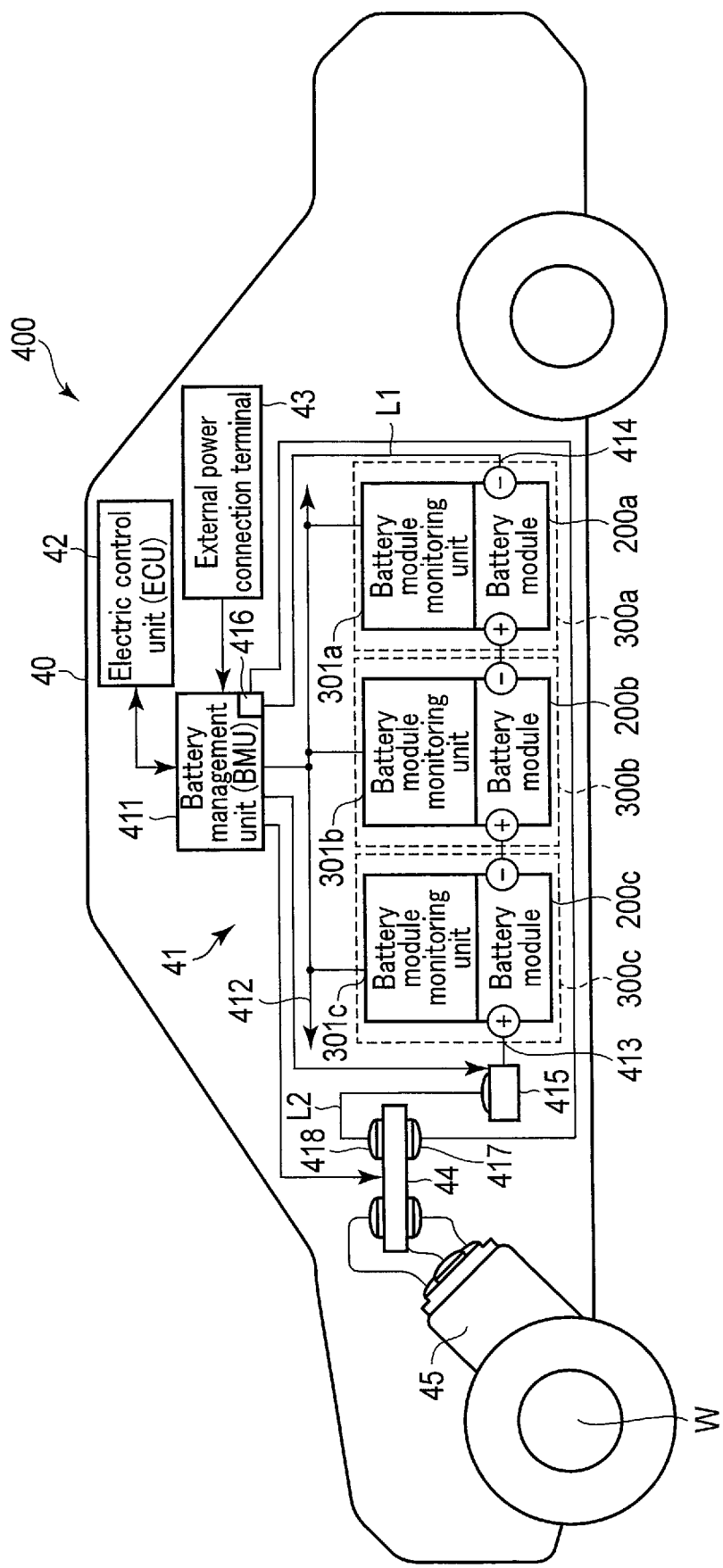
F I G. 12

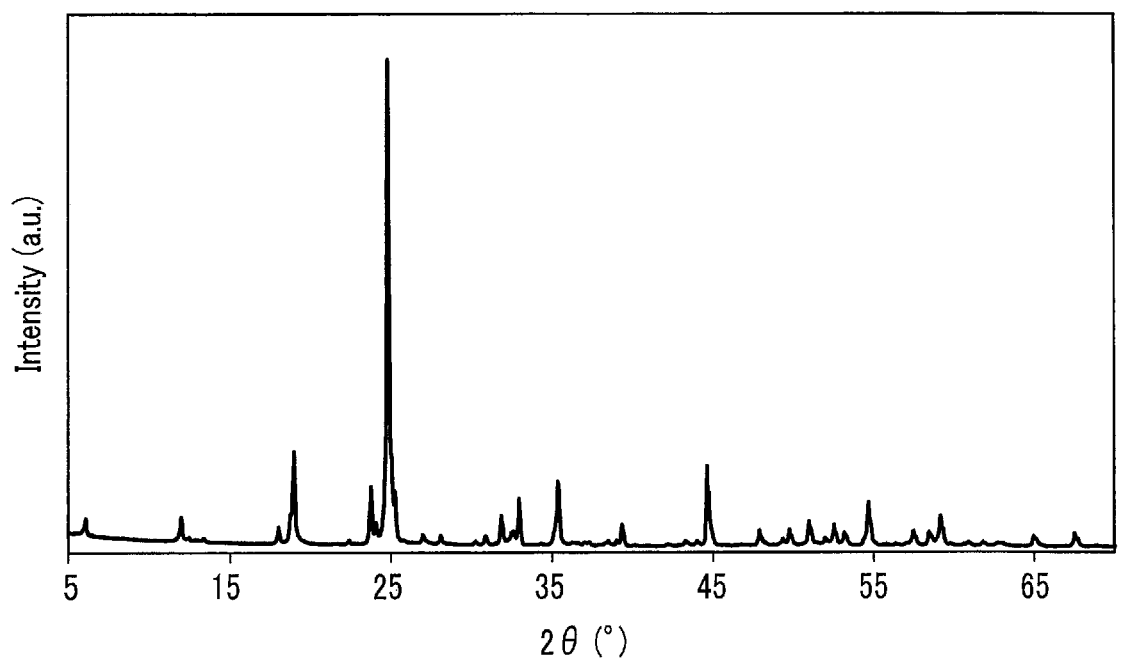
F I G. 13
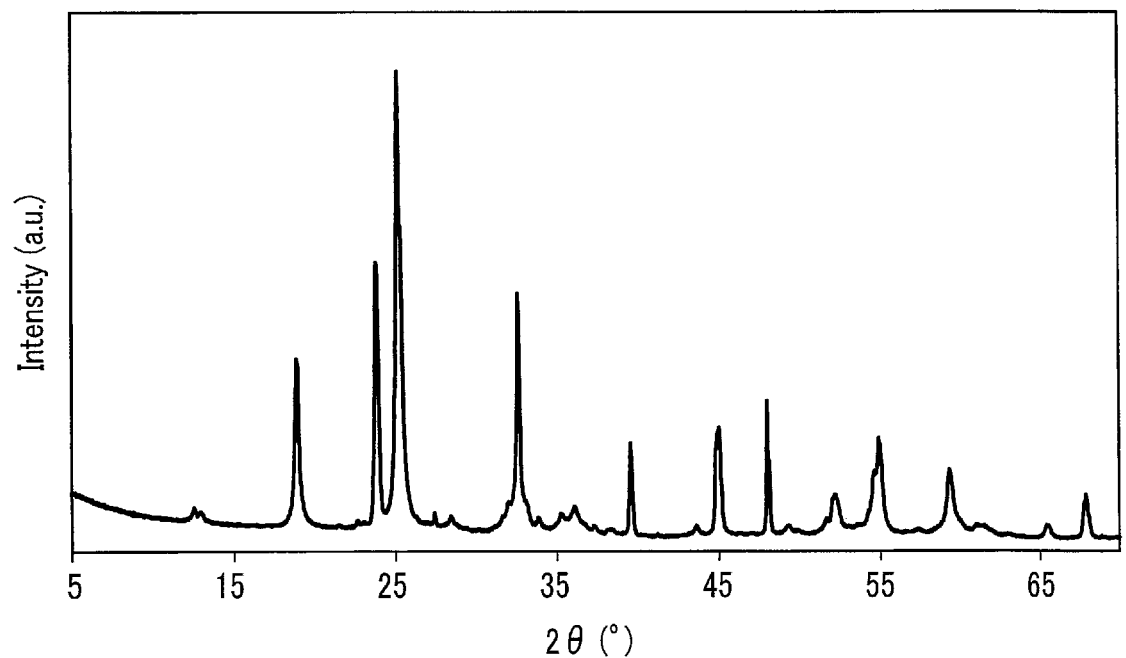
F I G. 14

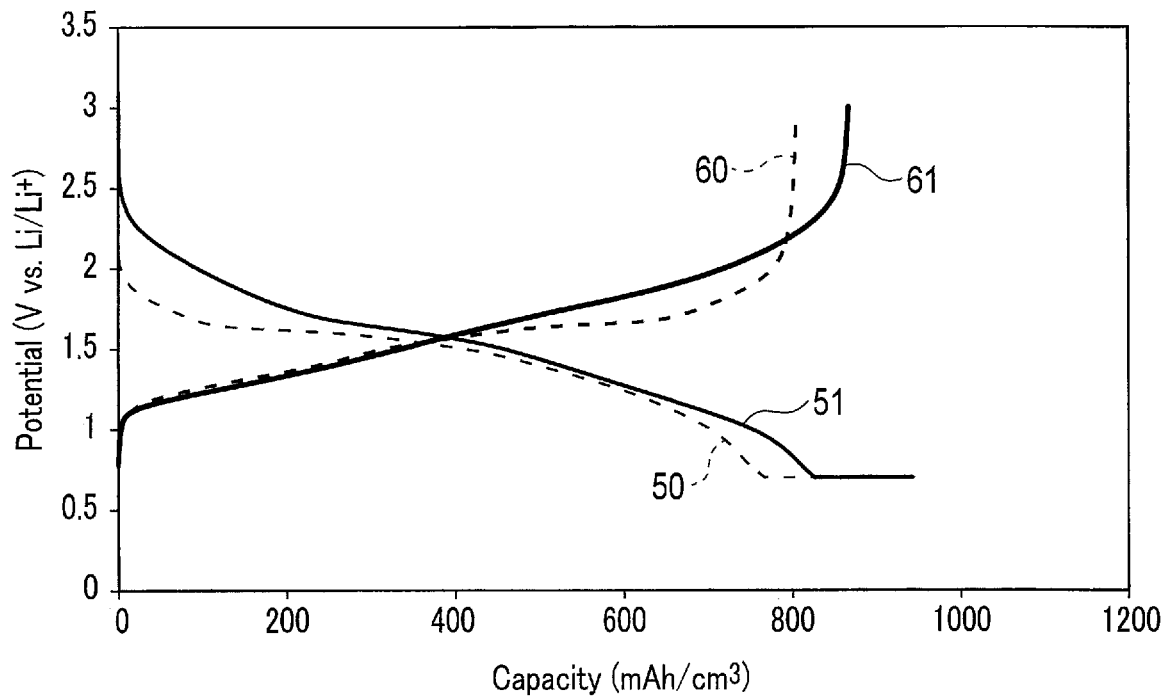
F I G. 17
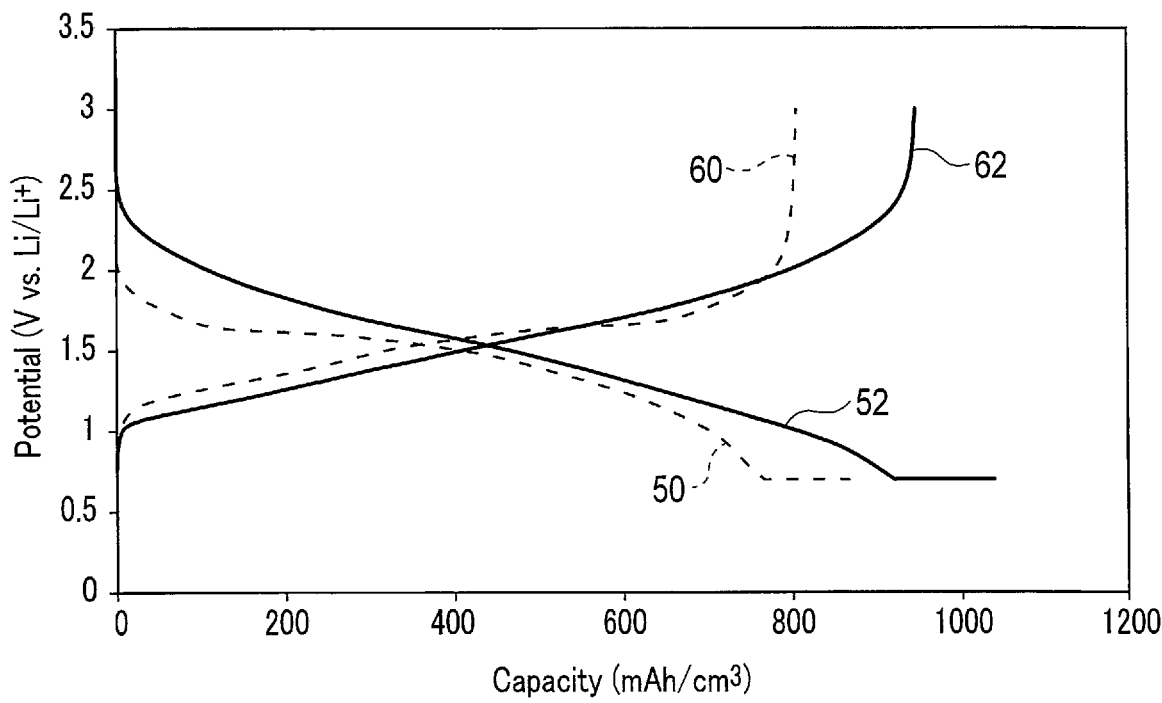
F I G. 18

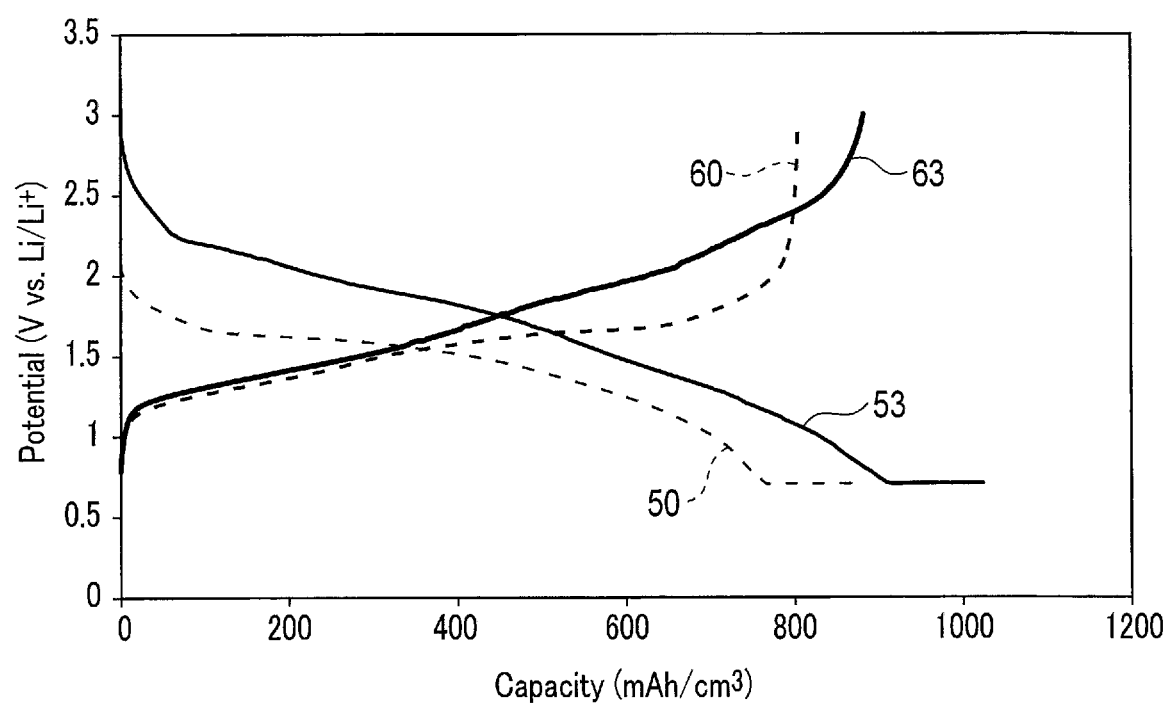
F I G. 19

ACTIVE MATERIAL, ELECTRODE, SECONDARY BATTERY, BATTERY PACK, AND VEHICLE

CROSS-REFERENCE TO RELATED APPLICATION

This application is based upon and claims the benefit of priority from Japanese Patent Applications No. 2021-043258, filed Mar. 17, 2021, and No. 2021-131236, filed Aug. 11, 2021, the entire contents of all of which are incorporated herein by reference.

FIELD

Embodiments relate to an active material, electrode, secondary battery, battery pack, and vehicle.

BACKGROUND

In recent years, as a high energy density battery, secondary batteries such as a lithium-ion secondary battery or a nonaqueous electrolyte secondary battery have been actively studied and developed. The secondary battery is anticipated as a power source for vehicles such as hybrid automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well.

One typical negative electrode adopted in a lithium ion battery is a carbon-based negative electrode which uses a carbonaceous material, such as graphite, as an active material.

When a battery using a carbon-based negative electrode is repeatedly charged and discharged at a rapid rate, precipitation of dendrites of metallic lithium on the electrode may occur, raising a concern of heat generation or ignition due to internal short circuit. To address this concern, a battery has been developed which uses a metal composite oxide in a negative electrode in place of a carbonaceous material to thereby increase the operation potential of the negative electrode. For example, a battery using a spinel-type lithium titanium composite oxide $Li_4Ti_5O_{12}$ in the negative electrode has a high average operating potential of 1.55V (vs. $Li/Li^+$). Therefore, such a battery can be rapidly and stably charged and discharged, because precipitation of Li dendrites does not proceed, and also has a longer life than that of a battery which uses a carbon-based negative electrode, because $Li_4Ti_5O_{12}$ operates at a potential at which reductive side reactions an electrolytic solution hardly occurs. However, a battery using $Li_4Ti_5O_{12}$ in the negative electrode has a drawback in that the theoretical capacity of the active material is as low as 175 mAh/g, and so, the energy density of the battery is lower than that of a battery having a carbon-based negative electrode.

For this reason, utilization of a monoclinic niobium-titanium composite oxide $TiNb_2O_7$ has been considered. $TiNb_2O_7$ is an active material which exhibits high capacity while having an operating potential near 1 V (vs. $Li/Li^+$) based on the oxidation-reduction potential of lithium. Thus, $TiNb_2O_7$ is expected to achieve a volume energy density beyond that of the carbon-based negative electrode. However, to commercialize electric vehicles on a full-scale, further enhancement of the energy density of lithium ion secondary batteries is desired in view of achieving increased traveling distance, etc., and thus, development of a rapid-charge battery having even higher capacity is being desired.

BRIEF DESCRIPTION OF THE DRAWINGS

FIG. 12 is a diagram schematically showing an example of a control system related to an electric system in the vehicle according to an embodiment;

FIG. 13 is a graph showing a spectrum obtained through wide-angle X-ray scattering measurement of an active material composite oxide in Example 1;

FIG. 14 is a graph showing a spectrum obtained through wide-angle X-ray scattering measurement of an active material composite oxide in Example 2;

FIG. 17 is a graph showing initial charge and discharge curves in Example 1 and Comparative Example 1;

FIG. 18 is a graph showing initial charge and discharge curves in Example 2 and Comparative Example 1; and FIG. 19 is a graph showing initial charge and discharge curves in Example 3 and Comparative Example 1.

DETAILED DESCRIPTION

Figure 1:
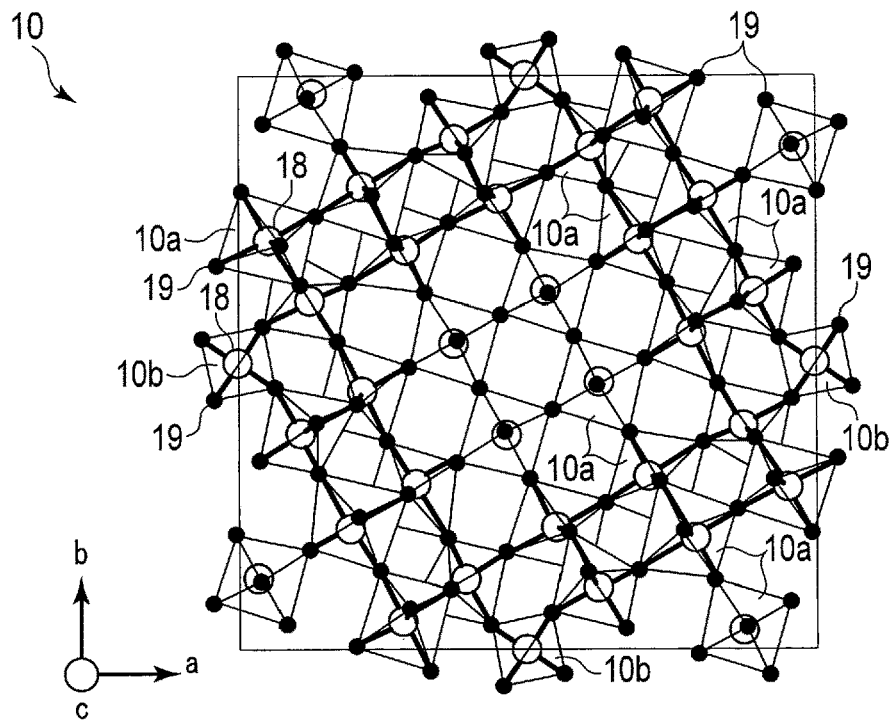
FIG. 1 is a schematic diagram showing a crystal structure of an example of a composite oxide included in an active material according to an embodiment.

According to one embodiment, provided is an active material including a composite oxide having a tetragonal crystal structure. The composite oxide is represented by general formula $Li_aTi_bNb_{2-2d}M_{c+2d}O_{2b+5+3c}$. Here, M is one selected from the group consisting of W and Mo, $0 \leq a \leq b+4+3c$, $0<b<2-2d$, and $0<c<2-4d$.

According to another embodiment, provided is an electrode including the above active material.

According to a further other embodiment, provided is a secondary battery including a positive electrode, a negative electrode, and an electrolyte. The negative electrode includes the above electrode.

According to a still another embodiment, provided is a battery pack including the above secondary battery.

In addition, according an embodiment, provided is a vehicle including the above battery pack.

In order to obtain a high-capacity material, a material capable of a large amount of charge compensation upon insertion carrier ions (e.g., lithium ions) is desirably selected. Thus, a composite oxide containing, for example, tungsten (W) or molybdenum (Mo), which are hexavalent elements, may be adopted as a compound having a higher capacity. As a tungsten-niobium composite oxide material, there is a compound having a crystal structure represented by $Nb_{18}W_8O_{69}$, $Nb_{16}W_5O_{55}$, or the like, as a composition with a large proportion of W. However, the reversible lithium insertion/extraction amount reported on such a material does not exceed 250 mAh/g. As for a molybdenum-niobium composite oxide material, no report of a battery material having a large content ratio of niobium has been made.

Hereinafter, embodiments will be described with reference to the drawings. The same reference signs are applied to common components throughout the embodiments and overlapping explanations are omitted. Each drawing is a schematic view for explaining the embodiment and promoting understanding thereof; though there may be differences in shape, size and ratio from those in an actual device, such specifics can be appropriately changed in design taking the following explanations and known technology into consideration.

First Embodiment

According to a first embodiment, an active material that includes a composite oxide having a tetragonal crystal structure is provided. The above composite oxide is represented by general formula $Li_aTi_bNb_{2-2d}M_{c+2d}O_{2b+5+3c}$. In the general formula, M is one selected from the group consisting of W and Mo. Each of the subscripts in the formula respectively satisfy $0 \leq a \leq b+4+3c$, $0<b<2-2d$, and $0<c<2-4d$. The active material may include minuscule amounts of additive elements as described later, and forms including the additive element(s) in the composite oxide as substituent elements are also included in the first embodiment; however, the above general formula represents a composition with such minuscule substituent elements omitted.

The active material may be an active material for a battery. The active material may be, for example, an electrode active material used in an electrode of secondary battery such as a lithium ion battery, a nonaqueous electrolyte battery, etc. More specifically, the active material may be, for example, a negative electrode active material used in the negative electrode of a secondary battery.

A high-capacity secondary battery can be realized by using, as an electrode active material, a composite oxide represented by the above general formula $Li_aTi_bNb_{2-2d}M_{c+2d}O_{2b+5+3c}$ (M is W or Mo; $0 \leq a \leq b+4+3c$, $0<b<2-2d$, and $0<c<2-4d$) and having a tetragonal crystal structure.

<Crystal Structure>

The composite oxide having a tetragonal structure included in the active material according to the first embodiment corresponds to a portion of an oxide material having a structure of a Wadsley-Roth phase, which is a crystal phase among niobium-containing oxide materials. It has been reported that the Wadsley-Roth phase takes a crystal structure with a ratio of oxygen O to a metal element M in the composition being in the range of $2.33 \leq A_O/A_M \leq 2.65$, assuming $A_O$ and $A_M$ as representing the number of atoms of oxygen and the number of atoms of the metal element, respectively. For example, $TiNb_2O_7$ has a crystal structure on the reduced side where $A_O/A_M=2.33$.

Herein, "reduced" means that the proportion of oxygen within the structure is low. The Wadsley-Roth phase takes a crystal structure in which a structure with vertex-sharing oxygen-metal octahedra forms a rhenium oxide-type block structure, and the blocks share the rhombohedra of the octahedra or a tetrahedron is interposed between the blocks and shares vertices to thereby connect the rhenium oxide-type blocks ($ReO_3$-type blocks) in a two-dimensional direction. The crystal structure on the reduced side takes a structure with small rhenium oxide-type blocks. Although the rhenium oxide-type crystal structure has cavities into which a large amount of Li can be inserted, the crystal structure is highly symmetric; thus, a change in the bond length between the metal element and oxygen for resolving the charge repulsion occurring upon Li insertion hardly occurs. As such, the rhenium oxide-type crystal structure can be said to be a structure which restricts Li insertion, due to the charge repulsion occurring upon Li insertion. With the crystal structure on the reduced side, the ratio $A_O/A_M$ becomes small, and thus the number of oxygen in the structure is reduced, leading to reduction of the size of the rhenium oxide-type blocks. Accordingly, there may be obtained a crystal structure capable of volume expansion due to a change in the bond length between the metal element and oxygen when Li is inserted. Therefore, while having a wide cavity by including the rhenium oxide-type crystal structure, Li insertion in great amount can be accomplished since there is no restriction on the structural change occurring when Li is inserted.

With the composite oxide included in the active material according to the first embodiment, as well, by taking a reduced-side crystal structure as with $TiNb_2O_7$, insertion of greater amounts of lithium (Li) into the crystal structure has become possible, and thus a crystal structure with a large reversible capacity has been obtained. Namely, the crystal structure of the composite oxide is a crystal structure of a reduced side belonging to the Wadsley-Roth phase consisting of three elements including titanium, which is an element of low valence of four.

The composite oxide having a tetragonal structure represented by the above general formula $Li_aTi_bNb_{2-2d}M_{c+2d}O_{2b+5+3c}$ (M is W or Mo; a, b, c, and d are numerical values satisfying $0 \leq a \leq b+4+3c$, $0<b<2-2d$, and $0<c<2-4d$), roughly speaking, includes a tetragonal titanium-niobium-tungsten composite oxide represented by the general formula $Li_aTi_bNb_2W_cO_{2b+5+3c}$, which is when M=W, and a tetragonal titanium-niobium-molybdenum composite oxide represented by the general formula $Li_aTi_bNb_{2-2d}Mo_{c+2d}O_{2b+5+3c}$, which is when M=Mo.

In the general formula $Li_aTi_bNb_{2-2d}M_{c+2d}O_{2b+5+3c}$, the subscripts b, c, and d may fall within the range of $0<b<2$, $0<c<2$, and $0 \leq d<0.5$, respectively. In the general formula $Li_aTi_bNb_2W_cO_{2b+5+3c}$ representing the tetragonal titanium-niobium-tungsten composite oxide, the subscripts b and c preferably fall within the range of $0.4 \leq b \leq 1.6$ and $0.4 \leq c \leq 1.6$, respectively. In the general formula $Li_aTi_bNb_{2-2d}Mo_{c+2d}O_{2b+5+3c}$ representing the tetragonal titanium-niobium-molybdenum composite oxide, the subscripts b, c, and d preferably fall within the range of $0.3 \leq b \leq 1.6$, $0.3 \leq c < 1.6$, and $0 \leq d < 0.4$, respectively.

FIG. 1 shows a schematic view of the crystal structure of $Ti_2Nb_{10}W_5O_{44}$ as an example of the tetragonal titanium-niobium-tungsten composite oxide represented by the general formula $Li_aTi_bNb_2M_cO_{2b+5+3c}$. In FIG. 1, the crystal structure is presented in terms of a unit lattice in the [001] direction, as viewed along the c-axis direction. The stoichiometric proportion in the composite oxide is represented by $Ti_2Nb_{10}W_5O_{44}$; however, the composition is equivalent to a formula $Ti_{0.4}Nb_2WO_{8.8}$. The notation of space group of to which the crystal structure belongs to is I-4, and the space group number thereof is attributed to 82. The "space group" as mentioned herein corresponds to the content of "International Tables for Crystallography", specifically, the content of Vol. A: Space-group symmetry (Second online edition (2016); ISBN: 978-0-470-97423-0, doi: 10.1107/97809553602060000114) of this document. The space group can also be described as being based on a simple cubic lattice having tetragonal axis or four-fold inversion axis similar to I-4 (space group No. 82), such as P4 (space group No. 75), I4 (space group No. 79), P-4 (space group No. 81), P4$_2$/n (space group No. 86), P4nc (space group No. 104), P-42$_1$c (space group No. 114), and P-4n2 (space group No. 118). The space group may vary when the composition ratio deviates from a stoichiometric composition ratio due to adjustment thereof or when structural distortion occurs due to the presence of a heterogeneous phase. In $Ti_2Nb_{10}W_5O_{44}$, a ratio of the number of atoms $A_O$ of oxygen O to the number of atoms $A_M$ of the metal element M (including Ti, Nb, and W) is $A_O/A_M=2.59$. The crystal structure 10 includes octahedra 10$a$ and tetrahedra 10$b$ each formed of a metal element 18 and oxygen 19. The octahedra 10$a$ are coupled to each other via sharing of vertices, thereby forming a rhenium oxide-type block (ReO$_3$-type block). The size of the block corresponds to $4\times4=16$ octahedra. The rhenium oxide-type block forms a plane in the a-axis direction and the b-axis direction by either sharing the edges of the octahedra 10$a$ or sharing the vertices of the tetrahedra 10$b$. A plurality of planes including the sixteen octahedra 10$a$ are connected to each other by sharing the edges of the octahedra and the vertices of the tetrahedra also towards the c-axis side, thereby forming the crystal structure.

In general, a tungsten-niobium composite oxide has a crystal structure with a large composition ratio of tungsten, and the crystal structure includes a block structure having a block size of $4\times5=20$ or $5\times5=25$. The titanium-niobium-tungsten composite oxide, which is aspect of the first embodiment, has been achieved as a result of finding that by including a tetravalent (low valence) titanium, the size of the block structure can be reduced even when the composition ratio of tungsten is high. Improvement in the Li insertion amount has become possible through reduction of the block size. Also, tungsten belongs to period 6 elements and thus is heavier than titanium and niobium. Thus, a material with an improved true density can be obtained as compared to conventional $TiNb_2O_7$. As a result, the capacity per volume can be improved.

Within the crystal structure, the ionic radii of hexavalent tungsten, tetravalent titanium, and pentavalent niobium are close to each other and thus can share equivalent sites. Niobium (Nb), titanium (Ti), and tungsten (W) are arranged in the 8g sites, which are metal sites of the octahedra (central site of the octahedral structure), and in the 2c sites, which are metal sites of the tetrahedra (central site of the tetrahedral structure), in such a manner that the charge balance in the crystal structure is adjusted. The occupancy ratio may vary for each site, resulting in maldistribution of the atoms. With such a crystal structure in which the atoms are unevenly distributed, the charge balance and the skeletal structure can be maintained, even when many elements are included in the crystal structure. Also, with the crystal structure including a tetrahedral site, improvement of in-solid diffusion of Li can be expected.

Figure 2:
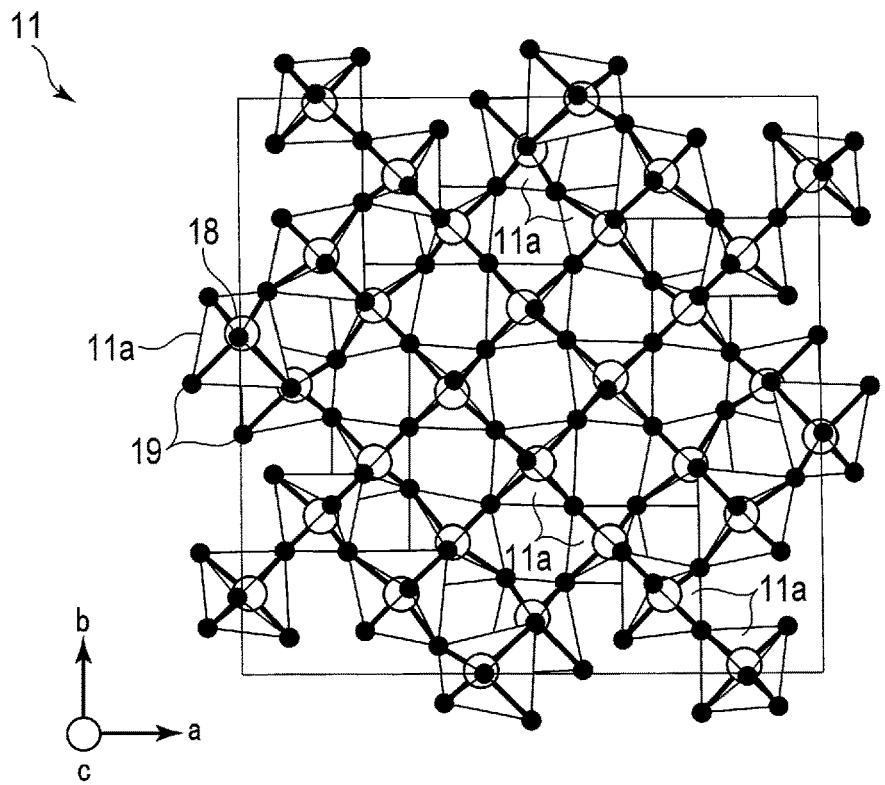
FIG. 2 is a schematic diagram showing a crystal structure of another example of a composite oxide included in the active material according to the embodiment.

FIG. 2 shows a schematic view of the crystal structure of $TiNb_2WO_{10}$ as another example of the titanium-niobium-tungsten composite oxide represented by the general formula $Li_aTi_bNb_2W_cO_{2b+5+3c}$. In FIG. 2 as well, the crystal structure is presented in terms of a unit lattice in the [001] direction, as viewed along the c-axis direction. Unlike FIG. 1, which shows the vertex-shared structure where the tetrahedra connect the rhenium oxide-type blocks, FIG. 2 shows a structure where edges are shared by the octahedra 11$a$ between rhenium oxide-type blocks. The notation of the space group of the crystal structure can be described as being based on I-4 (space group No. 82), or a simple cubic lattice having tetragonal axis or four-fold inversion axis similar to I-4 (space group No. 82), such as P4 (space group No. 75), I4 (space group No. 79), P-4 (space group No. 81), P4$_2$/n (space groupNo. 86), P4nc (space groupNo. 104), P-42$_1$c (space group No. 114), and P-4n2 (space group No. 118). The space group may vary when the composition ratio deviates from a stoichiometric composition ratio due to adjustment thereof or when structural distortion occurs due to the presence of a heterogeneous phase. In $TiNb_2WO_{10}$, a ratio of the number of atoms of oxygen O ($A_O$) to the number of atoms of the metal element M ($A_M$=the number of Ti atoms+the number of Nb atoms+the number of W atoms) is $A_O/A_M=2.50$. Reducing the ratio $A_O/A_M$ by increasing the composition ratio of Ti in the crystal structure can realize such a crystal structure as shown in FIG. 2. Due to the replacement of the connection via the vertices of the tetrahedra into the connection via the edges of the octahedra, the amount of cavities due to Li insertion increases, and structural alleviation through change in the bond length upon Li insertion becomes easy. Thus, $TiNb_2WO_{10}$ (FIG. 2) has a further improved reversible capacity as compared with $Ti_2Nb_{10}W_5O_{44}$ (FIG. 1).

In the aspect where the element M is tungsten (W) in the general formula $Li_aTi_bNb_{-2d}M_{c+2d}O_{2b+5+3c}$ of the active material according to the first embodiment, the titanium-niobium-tungsten composite oxide as an active material is represented by the general formula $Li_aTi_bNb_2W_cO_{2b+5+3c}$. The crystal structure of this composite oxide may take, for example, the crystal structure shown in FIG. 1, the crystal structure shown in FIG. 2, or a crystal structure including both. The respective subscripts in the above general formula $Li_aTi_bNb_2W_cO_{2b+5+3c}$ may be in the range of $0 \leq a \leq b+4+3c$, $0<b<2$, and $0<c<2$. Throughout the whole of these ranges, a high-capacity active material can be obtained, and the composition may be selected according to the battery design.

In general, tungsten (W) and titanium (Ti) can easily enter into the structure in the Wadsley-Roth phases, for which many forms with varying composition ratios exist. Thus, substitution of niobium (Nb) in the structure is easier than that with other elements. Accordingly, the composition ratio within the crystal structure can be adjusted by combining the elements W, Ti, and Nb.

Figure 3:
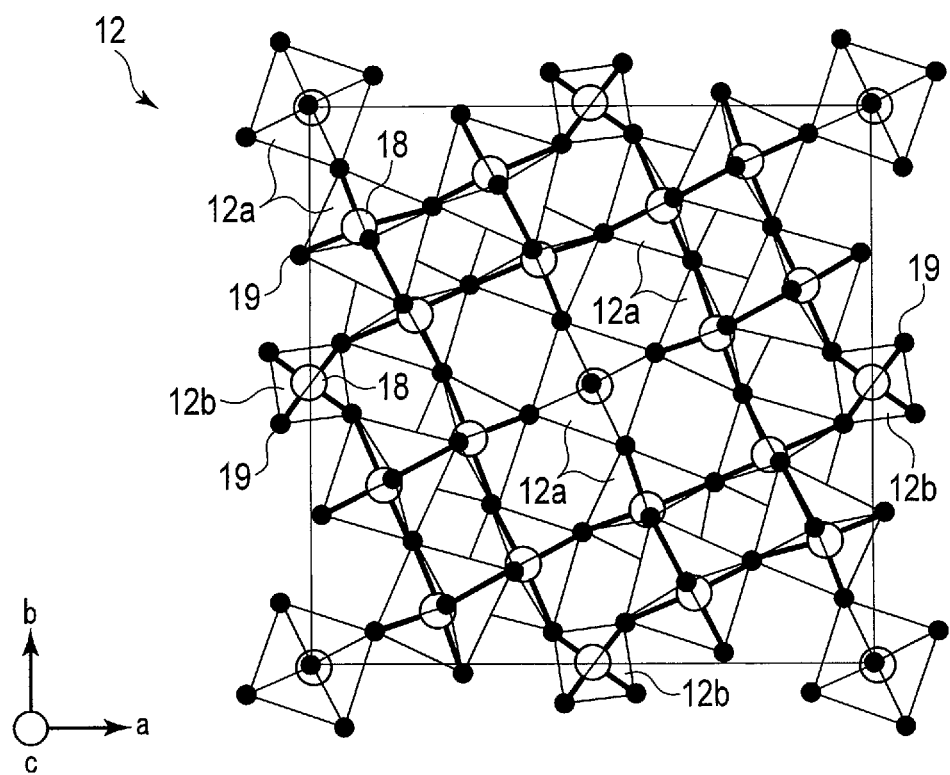
FIG. 3 is a schematic diagram showing a crystal structure of still another example of a composite oxide included in the active material according to the embodiment.

FIG. 3 shows a schematic view of the crystal structure of $TiNb_5Mo_2O_{20}$ as an example of the tetragonal titanium-niobium-molybdenum composite oxide represented by the general formula $Li_aTi_bNb_{2-2d}Mo_{c+2d}O_{2b+5+3c}$. In FIG. 3, the crystal structure is presented in terms of a unit lattice in the

[001] direction, as viewed along the c-axis direction. The stoichiometric proportion in the composite oxide is represented by $TiNb_5Mo_2O_{20}$; however, the composition is equivalent to a formula $Ti_{1/3}Nb_{5/3}Mo_{2/3}O_{20/3}$. The notation of space group of the crystal structure belongs to I-4, and the space group number of the crystal structure is attributed to 82. The space group can also be described, however, as being based on a simple cubic lattice having tetragonal axis or four-fold inversion axis similar to I-4 (space group No. 82), such as P4 (space group No. 75), I4 (space group No. 79), P-4 (space group No. 81), $P4_2/n$ (space group No. 86), P4nc (space group No. 104), P-421c (space group No. 114), and P-4n2 (space group No. 118). The space group may vary when the composition ratio deviates from a stoichiometric composition ratio due to adjustment thereof or when structural distortion occurs due to the presence of a heterogeneous phase. In $TiNb_5Mo_2O_{20}$, a ratio of the number of atoms of oxygen O to the number of atoms of the metal element M (including Ti, Nb, and Mo) is $A_O/A_M$=2.50. The crystal structure 12 includes octahedra 12a and tetrahedra 12b formed of a metal element 18 and oxygen 19. The octahedra 12a are coupled to each other via sharing vertices, thereby forming a rhenium oxide-type block. The size of the block corresponds to a structure in which 3×3=9 octahedra 12a are arranged.

Molybdenum (Mo) can be incorporated into the crystal structure not only in the form of a hexavalent element but also in the form of a pentavalent element. With the hexavalent element, the charge compensation together with Ti at the time of Li insertion is a three-electron reaction, and thus, the theoretical capacity of Li capable of being inserted can be improved. The pentavalent element is present in the form of substituting Nb. Mo as a pentavalent element is present in the crystal structure in a manner of having electrons supplied to the d band of Mo. Therefore, when pentavalent Mo is included, the electrical conductivity changes, leading to an improved battery capacity. The Wadsley-Roth phase including molybdenum is known to have increased operating potential (i.e., become noble). With a crystal structure including molybdenum at a high concentration, the titanium-niobium-molybdenum composite oxide, which is one aspect according to the first embodiment, can have a higher operating potential than that of $TiNb_2O_7$. As a result, the operating potential is within a potential region where there is little side reaction of reduction of the electrolytic solution, leading to high life performance. Furthermore, since the shape of the potential curve of the above composite oxide changes more steeply than that of $TiNb_2O_7$, a secondary battery using the above composite oxide in the negative electrode can be expected to exhibit further improved input-output performance.

The subscript c in the general formula $Li_aTi_bNb_{2-2d}MO_{c+2d}O_{2b+5+3c}$ represents the stoichiometric ratio of hexavalent Mo. The subscript d is proportional to the stoichiometric ratio of pentavalent Mo, and "2d" represents the stoichiometric ratio of pentavalent Mo. As for the titanium-niobium-tungsten composite oxide described above, W in the form of a pentavalent element is not incorporated into the crystal structure; thus, the general formula $Li_aTi_bNb_2WocO_{2b+5+3c}$ does not include the subscript d (in other words, d=0).

In a powder X-ray diffraction diagram (diffraction spectrum) using a Cu-Kα ray source of the above-described composite oxide having a tetragonal crystal structure, a peak intensity I1 of a peak having the highest intensity appearing within the range of 2θ=25.1±0.5° and a peak intensity I2 of a peak appearing within the range of 2θ=23.8±0.5° preferably satisfy the relationship of 0.1≤I2/I1≤1.0, and more preferably satisfy the relationship of 0.1≤I2/I1≤0.8. The main peak appearing within the range of 2θ=25.1±0.5° in the X-ray diffraction diagram, which corresponds to the peak intensity I1, is attributed to a plane of the crystal structure not including the c-axis. The peak appearing within the range of 2θ=23.8±0.5° in the X-ray diffraction diagram, which corresponds to the peak intensity I2, is attributed to a plane direction including the c-axis.

The crystal structure of the composite oxide of the active material has a wide cavity in the c-axis direction. Therefore, Li in the crystal structure diffuses mainly in the c-axis direction. The above peak intensity ratio I2/I1 being in the range of 0.1≤I2/I1≤1.0 or 0.1≤I2/I1≤0.8 leads to reduction of the diffusion distance of Li. Namely, in the composite oxide having the ratio I2/I1 in the range of 0.1≤I2/I1≤1.0 or the composite oxide having the ratio in the range of 0.1≤I2/I1≤0.8, the orientation in the c-axis direction within the crystal structure is suppressed. Therefore, satisfying such an intensity ratio can improve the battery performance. The peak intensity ratio I2/I1 is preferably within the range of 0.1≤I2/I1≤0.9, and more preferably within the range of 0.1≤I2/I1≤0.65.

The conditions for the above peak intensity ratio can be satisfied by adjusting the ratio Ti/Nb or the ratio M/Nb (M=W or Mo) in the stoichiometric composition and thereby suppressing the rate of crystal growth during firing performed when synthesizing the composite oxide. Namely, the orientation in the c-axis direction in the crystal structure can be controlled by adjusting the element ratio in the composite oxide. Since the above composite oxide can maintain its structure while changing its crystal structure even if the ratio Ti/Nb and the ratio M/Nb are adjusted, the composition range thereof is wide. Thus, there is enough liberty in the composition to allow controlling of the orientation by adjusting the composition ratio.

<Elements Added in Minuscule Amounts>

The performance of the active material can be further improved by adding an element to the composite oxide. Namely, the active material according to the first embodiment may include a minuscule amount of additive element in addition to the tetragonal composite oxide represented by the above general formula $Li_aTi_bNb_{2-2d}M_{c+2d}O_{2b+5+3c}$. Examples of the additive element include Ti, V, Ta, Fe, Bi, Sb, As, P, Cr, Mo, W, B, Na, K, Mg, Al, Ca, Y, Zr and Si.

The above additive elements may be included in the structure in the form of substituting a part of the constituent elements of the composite oxide. Namely, the active material according to the first embodiment also encompasses a substituted oxide based on the tetragonal composite oxide represented by the above general formula $Li_aTi_bNb_{2-2d}M_{c+2d}O_{2+5+3c}$. Also, the above additive elements may be present in the active material in the form of not being included in the crystal structure of the composite oxide.

For example, vanadium (V) and phosphorus (P) can be incorporated into the crystal structure as pentavalent elements. By substituting tetravalent Ti included as a basic constituent element by a pentavalent element, the electron conductivity of the active material can be improved. As a result, the rate performance and the life performance of the active material can be enhanced. Furthermore, with respect of the titanium-niobium-molybdenum composite oxide, since the skeletal structure thereof is a crystal structure of the same type as those of $Nb_9VO_{25}$ and $Nb_9PO_{25}$, substituting V and P into the structure is particularly easy. $Nb_9VO_{25}$ and $Nb_9PO_{25}$ have a lower operating potential than that of the titanium-niobium-molybdenum composite oxide, and introducing V and/or P can render the operating potential of the titanium-niobium-molybdenum composite oxide closer to those of $Nb_9VO_{25}$ and $Nb_9PO_{25}$. Thus, the curve shape of the battery can be adjusted by substituting an element by V and/or P.

An element selected from Mo, W, V, potassium (K), boron (B), and sodium (Na) can provide effects as a sintering agent because of the low melting point of the composite oxide. Here, W as an additive element indicates an additive applied to a niobium-titanium-molybdenum composite oxide ($Li_aTi_bNb_{2-2d}Mo_{c+2d}O_{2b+5+3c}$). Likewise, Mo as an additive element indicates an additive applied to a niobium-titanium-tungsten composite oxide ($Li_aTi_bNb_2W_cO_{2b+5+3c}$). V, K, B, and Na can be applied to both of the composite oxides. By adding these elements in minuscule amounts, the firing temperature can be lowered at the time of synthesizing the composite oxide to thereby improve the crystallinity. By enhancing the crystallinity, the rate performance and the cycle performance of the active material can be enhanced. In addition, although Mo and W included as basic constituent elements in the niobium-titanium-molybdenum composite oxide and the niobium-titanium-tungsten composite oxide, respectively, easily vaporize at the time of firing, the vaporization can be suppressed at the time of firing by lowering the firing temperature.

Titanium (Ti) as a tetravalent element can substitute a part of Nb. Thus, the amount of substitution of the hexavalent element in the structure can be increased to adjust the electrical charge, leading to improved battery performance.

Tantalum (Ta) as a pentavalent element can substitute Nb. Since Ta and Nb belong to the same group in the periodic table, they have similar physical and chemical properties. Thus, even if Nb is substituted by Ta, equivalent battery performance can be achieved.

An element selected from iron (Fe), chromium (Cr), aluminum (Al), bismuth (Bi), antimony (Sb), and arsenic (As) can be incorporated into the crystal structure as a trivalent element. Magnesium (Mg) can be incorporated into the crystal structure as a divalent element. By substituting Ti by a trivalent or divalent element, it is possible to increase the compositional ratio of W or Mo as a hexavalent element to maintain the electrical neutrality within the structure. Thus, the theoretical capacity of the battery can be increased, and the amount of Li inserted into the active material can be further increased.

Elements such as calcium (Ca), zirconium (Zr), yttrium (Y), and silicon (Si) are elements whose oxides may be stably present under the firing conditions in the synthesis of the composite oxide, and that are not substituted into the crystal structure. These elements, when present in minuscule amounts, can function as a particle-growth suppressor which suppresses particle growth during firing. Thus, the shape of the particle size distribution can be adjusted, allowing for further suppression of variation in the particle size distribution.

The at least one element selected from the group consisting of Ti, V, Ta, Fe, Bi, Sb, As, P, Cr, Mo, W, B, Na, K, Mg, Al, Ca, Y, Zr and Si are preferably added in minuscule amounts. Specifically, it is preferable to limit the amount of the additive element in the range of 10 ppm to 10000 ppm in terms of mass, and is more preferable to limit the amount in the range of 3000 ppm or less in terms of mass with respect to the general formula $Li_aTi_bNb_{2-2d}M_{c+2d}O_{2b+5+3c}$. The active material according to the first embodiment does not exclude a substituted composite oxide which includes a minutely substituting element incorporated into the crystal structure of the composite oxide even though the composition of the composite oxide is represented by the general formula $Li_aTi_bNb_{-2d}M_{c+2d}O_{2b+5+3c}$.

Obviously, a minuscule amount of additive element not incorporated into the crystal structure of the composite oxide is not presented in the above general formula, either; however, the active material according to the first embodiment also encompasses an aspect of including the above element(s) in addition to the composite oxide. The active material according to the first embodiment may be an unsubstituted composite oxide of $Li_aTi_bNb_{2-2d}M_{c+2d}O_{2b+5+3c}$ not including the above minutely substituting element(s).

<Active Material Particles>

The active material according to the first embodiment may be in a particulate form, for example. Namely, the active material may be formed of particles of a composite oxide represented by the general formula $Li_aTi_bNb_{2-2d}M_{c+2d}O_{2b+5+3c}$ (irrespective of the presence or absence of a minutely substituting element) and having a tetragonal crystal structure. The active material may also be formed of particles that include the above-described elements that may be added in minuscule amounts in addition to the composite oxide. The active material may be in the form of discrete primary particles, secondary particles formed of agglomerated primary particles, or a mixture of the primary particles and the secondary particles. The active material may include the above elements, for example, on the surface of the primary particles of the composite oxide or between the primary particles of the composite oxide.

An average primary particle size of the active material according to the first embodiment is preferably 10 μm or less, more preferably 5 μm or less, and still more preferably 3 μm or less. If the average primary particle size of the active material is small, the distance of diffusion of lithium ions in the primary particles is short, and thus the diffusivity of lithium ions tends to improve. Also, if the average primary particle size of the active material is small, the reaction area increases, and thus the reactivity between the active material and lithium ions increases, whereby insertion-extraction reaction of lithium ions tends to improve.

An average secondary particle size of the active material according to the first embodiment is preferably from 1 μm to 50 μm. When the average secondary particle size of the active material is within this range, the productivity at the time of manufacturing an electrode can be improved, and also, a battery with favorable performance can be obtained. The average secondary particle size refers to a particle size at which a cumulative volume value is 50% in a particle size distribution obtained using a laser diffraction particle size analyzer.

The BET specific surface area of the active material is preferably from 3.0 $m^2/g$ to 120 $m^2/g$, and more preferably from 4.0 $m^2/g$ to 110 $m^2/g$. When an active material having a high specific surface area is used, the discharge rate performance of the battery can be increased. When an active material having a low specific surface area is used, the life performance of the battery can be improved, and the coatability of a slurry including the active material can be favorable in the process of producing an electrode, which will be described later in the second embodiment.

The BET specific surface area refers to a specific surface area obtained by a nitrogen BET (Brunauer, Emmet and Teller) method. The method for obtaining the specific surface area based on the nitrogen BET method will be described in detail, later.

<Production Method>

The active material according to the first embodiment can be produced as described below. The production method of the active material will be described respectively for the aspect as titanium-niobium-tungsten composite oxide with element M being W in the general formula $Li_aTi_bNb_{2-2d}M_{c+2d}O_{2b+5+3c}$, and the aspect as titanium-niobium-molybdenum composite oxide with the element M being Mo in the general formula.

(Synthesis of Titanium-Niobium-Tungsten Composite Oxide)

Production of the titanium-niobium-tungsten composite oxide is not particularly limited; however, the composite oxide may be synthesized by, for example, a solid-phase reaction method, a sol-gel method, a hydrothermal synthesis method, or the like. A solid-phase reaction method will be described as an example. The solid-phase reaction method does not use a liquid phase, and thus is a simple and inexpensive production method.

As starting materials, a titanium compound, a niobium compound, and a tungsten compound are used. Examples of the titanium compound include titanium hydroxide, anatase-type titanium oxide, and rutile-type titanium oxide. Examples of the niobium compound include niobium hydroxide and niobium oxide. Examples of the tungsten compound include ammonium paratungstate and a hydrate thereof, ammonium tungstate and a hydrate thereof, tungsten hydroxide, and tungsten oxide.

When producing a substituted composite oxide in which titanium, niobium, or tungsten in the crystal structure has been substituted by a minuscule amount of element described above (minute additive element), an oxide of the element to be introduced as a substituting element, for example, may be further included in the starting materials.

As the starting materials, for example, particulate materials are used. The average particle size of the starting materials is 5 μm or less, and more preferably 2 μm or less. In the solid-phase reaction method, the reaction progresses from the contact point between the particles; thus, reducing the particle size can enhance the reactivity, so that a target phase can be easily obtained.

After the starting materials are weighed at a predetermined composition ratio, the starting materials are mixed sufficiently. Mixing may be performed by either a wet method or a dry method. After the starting materials are mixed, firing is performed.

The firing may include pre-firing performed prior to main firing. Pre-firing is preferably performed at a temperature of 800° C. to 1100° C. for 5 hours to 20 hours. The solid-phase reaction can be advanced in such ranges of firing temperature and firing time. By having reaction in advance due to inclusion of the pre-firing prior to main firing, the reactivity can be enhanced.

The main firing is preferably performed at a temperature of 1000° C. to 1200° C. for 5 hours to 20 hours. In such ranges of firing temperature and firing time, the solid-phase reaction can be progressed and a target crystal phase can be obtained.

After the firing, pulverization of the starting materials is performed using a pulverization apparatus until the materials have a predetermined average particle size. When the pulverizing is performed, the crystallinity of the active material may degrade due to mechanical impact. In this case, it is preferable to perform anneal-firing again to restore the crystallinity. The anneal-firing is preferably performed at a temperature of 800° C. to 1000° C. for 1 hour to 5 hours.

(Synthesis of Titanium-Niobium-Molybdenum Composite Oxide)

Production of the titanium-niobium-molybdenum composite oxide is not particularly limited; however, the composite oxide may be synthesized by, for example, a solid-phase reaction method, a sol-gel method, a hydrothermal synthesis method, or the like. A production method adopting a sol-gel method will be described as an example.

As starting materials, a titanium compound, a niobium compound, and a molybdenum compound are used. Examples of the titanium compound include titanium tetraisopropoxide, titanyl sulfate, titanium chloride, titanium ammonium oxalate and a hydrate thereof, and titanium hydroxide. Examples of the niobium compound include niobium chloride, niobium ammonium oxalate and a hydrate thereof, and niobium hydroxide. Examples of the molybdenum compound include molybdenum chloride, ammonium molybdate and a hydrate thereof, and molybdenum hydroxide.

The starting materials are preferably dissolved in pure water or an acid in advance to form a solution. By forming a solution, a dry gel in which respective elements are uniformly mixed can be obtained, so that the reactivity can be enhanced. When the starting materials cannot be dissolved in pure water, an acid is used to dissolve them.

Examples of the acid to be used to dissolve the starting materials include citric acid and oxalic acid, and oxalic acid is preferably used in view of solubility. When oxalic acid is used, for example, the concentration is preferably set to 0.5 M to 1 M. The starting materials are preferably dissolved at a temperature of 70° C. or higher in order to reduce the reaction time.

If dissolving of the starting materials is difficult, a dispersion liquid can be formed to proceed with the reaction. In this case, the average particle size of the starting materials included in the dispersion liquid is favorably 3 μm or less, and more preferably 1 μm. After a solution (or a dispersion liquid) in which the respective compounds are adjusted to a predetermined composition ratio is prepared, neutralization using an aqueous solution of ammonia is performed while heating and stirring the solution, to thereby adjust the pH. A gel liquid is obtained by adjusting the pH. By setting the pH to 5 to 8, a gel which uniformly contains the respective starting materials can be formed, whereby a dry gel which exhibits favorable reactivity during firing can be obtained.

Subsequently, the gel liquid is heated up to a temperature close to a boiling point to evaporate moisture, thereby making gelation progress. After gelation, moisture is further evaporated to perform drying, whereby a dry gel is obtained. When performing gelation and drying, the whole solution may be concentrated by evaporation to obtain a dry gel; however, use of a spray dryer is more preferable because the particle size after the drying can be made smaller. The average particle size of the dry gel produced by evaporating and concentrating the whole solution is preferably reduced to 10 μm or less, and more preferably 5 μm or less by performing pulverization before the firing. Thereby, the particle size after the firing can be made small. The dry gel thus obtained is fired.

When firing the dry gel, pre-firing is performed at a temperature of 200° C. to 500° C. for 1 hour to 10 hours. Thereby, excess organic components can be eliminated, which makes it possible to enhance the reactivity during the main firing.

The main firing is preferably performed at a temperature of 700° C. to 900° C. for 1 hour to 10 hours. By performing firing in such a temperature range, a target phase can be obtained while suppressing sublimation of molybdenum.

The powder after the firing may have a high average particle size due to formation of agglomerates. In this case, pulverizing is preferably performed to adjust a predetermined average particle size.

When a minuscule amount of element described above is added to the active material including a composite oxide synthesized by the sol-gel method, for example, an oxide of the element to be added is mixed in the powder sample obtained by pulverizing the dry gel, prior to the firing. By performing firing in a state having the oxide mixed, there can be obtained an active material that includes the element (s) together with the composite oxide, or an active material that includes a substituted composite oxide in which the element(s) is introduced into the crystal structure of the composite oxide. In the case of adding an oxide of an element which exhibits the effects as a sintering agent, the firing temperature can be lowered.

<Various Measurement Methods>

Measurement methods for the active material will be explained below. Specifically, examination of the composite oxide, measurement of the average particle size of the active material particles, and measurement of the specific surface area of the active material will be described.

In a case where an active material included in an electrode of a battery is to be taken as a sample, the measurement sample is prepared by performing a pretreatment by the following method. First, the battery is completely discharged. Next, the battery is disassembled in a glove box under an argon atmosphere, and the electrode is taken out. Next, the taken-out electrode is washed using a solvent such as ethyl methyl carbonate. Further processing is performed in accordance with the measurement to be performed, so as to prepare a sample in appropriate form.

(Examination of Composite Oxide)

Examination as to whether the active material includes the composite oxide having a tetragonal crystal structure and represented by the general formula $Li_aTi_bNb_{2-2d}M_{c+2d}O_{2b+5+3c}$ described above can be made by a combination of a wide-angle X-ray diffraction (XRD) method, inductively coupled plasma (ICP) emission spectrometry, and inert gas dissolution-infrared absorption spectroscopy. The crystal structure can be determined by the wide-angle XRD method, and the elemental composition can be determined by the ICP emission spectrometry and the inert gas dissolution-infrared absorption spectroscopy.

XRD measurement is performed as follows. First, active material particles are sufficiently pulverized to obtain a powder sample. The average particle size of the powder sample is preferably set to 20 μm or less. The average particle size can be obtained by a laser diffraction particle size distribution measuring apparatus.

Next, the powder sample is packed in the holder portion of a glass sample plate, and the surface is made flat. As the glass sample plate, for example, a glass sample plate whose holder portion has a depth of 0.2 mm may be used.

Next, the glass sample plate is placed in a powder X-ray diffraction apparatus, and the XRD spectrum is measured using Cu-Kα rays. Specific measurement conditions are, for example, as follows:

X-ray diffraction apparatus: SmartLab available from Rigaku
X-ray source: Cu-Kα rays
Output: 40 kV, 200 mA
Package measurement name: general-purpose measurement (concentration method)
Incident parallel slit opening angle: 5°
Incident longitudinal restriction slit length: 10 mm
Light-receiving PSA: absent
Light-receiving parallel slit opening angle: 5°
Monochromatization method: Kβ filtering method
Measurement mode: continuous
Incident slit width: 0.5°
Light-receiving slit width: 20 mm
Measurement range (2θ): 5° to 70°
Sampling width (2θ): 0.01°
Scan speed: 1° to 20°/min The XRD spectrum corresponding to the active material is thus obtained. In the XRD spectrum, the abscissa represents the incident angle (2θ), and the ordinate represents the diffraction intensity (cps). The scan speed may be adjusted within a range where the number of counts for the main peak of the XRD spectrum would be 50 thousand counts or more and 150 thousand counts or less.

When an active material contained in the electrode of a battery is used as a sample, the washed electrode obtained by the performing the above pretreatment is cut to about the same area as the area of the holder of the glass sample plate, to thereby obtain a measurement sample.

Next, the obtained measurement sample is directly put onto the glass holder, and XRD measurement is performed. Subsequently, measurement is performed using the XRD for the materials other than the active material that may be contained in the electrode, such as a current collector, electro-conductive agent, binder, and the like, thereby ascertaining the XRD pattern derived from those materials. Next, if there are overlapping peaks between a peak considered to be derived from the active material and the peaks of the other materials in the measurement sample, the peaks of the materials other than the active material are separated. The XRD spectrum concerning the active material is thus obtained.

A Rietveld method is used to ascertain whether the crystal structure of the sample measured belongs to the above-described tetragonal crystal structure. The ascertainment can be made by examining that a value R p as a reliability factor is at least 20% or less, more preferably 15% or less using, for example, RIETAN-FP as an analysis program. At this time, if there is a peak including impurities and the peak overlaps with a phase to be analyzed, the analysis precision may be degraded. In this case, analysis is preferably performed with a section that clearly overlaps with the impurities-derived peak excluded from the analysis range. This is not always the case, however, because the intensity ratio varies when a material other than the active material according to the first embodiment is included in the sample, when the orientation of the sample is significantly high, or when coarse particles are mixed. Therefore, the structure is determined by ascertaining that there is no contradiction in the position or relative intensity of all the peaks attributed to the crystal structure. Also, when the spectrum intensity is low and the background intensity is low, the value $R_{wp}$ may become small. Thus, the reliability factor does not have meaning in its absolute value, but has meaning in relatively determining how well the fitting is under certain measurement conditions.

A detailed explanation of the analysis method using RIETAN-FP is given in, for example, Chapter 9 "Let's use RIETAN-FP" in Izumi Nakai, Fujio Izumi, "Facts about Powder X-ray Analysis", 1st edition (2002), The Discussion Group of X-Ray Analysis, The Japan Society for Analytical Chemistry, (Asakura Shoten).

RIETAN-FP is a program for Rietveld analysis available (at least in February 2021) for free on the Internet at the developer's webpage (http://fujioizumi.verse.jp/).

In regard to the content of the respective elements of the active material particles included in the sample, with respect to that of metal elements, the content can be ascertained by the ICP emission spectrometry. With respect to that of the element O, the content can be quantified by a method such as inert gas dissolution-infrared absorption spectroscopy; however, precise quantification is difficult to perform.

For active material particles included in the electrode, after performing the above-described pretreatment, the following treatment is further performed. After washing the electrode, a component containing an active material (e.g., the active material-containing layer described in the second embodiment) is dislodged from the current collector of the electrode, for example. The portion dislodged off from the electrode is heated for a short period of time in air (at 500° C. for about 1 hour), to sinter off unnecessary portions such as a binder component and carbon. Thereafter, the ICP emission analysis, etc., can be performed to quantify the content of the respective elements.

(Measurement of Average Particle Size)

The average primary particle size of the active material can be determined by observation using a scanning electron microscope (SEM). Specifically, the average primary particle size by the SEM observation can be calculated by the following method.

First, in a primary particle of a SEM image obtained by the SEM observation, the length of the longest portion and the length of the shortest portion are measured, and the arithmetic mean value of these lengths is calculated as the primary particle size. The measurement of the primary particle size is done for 100 optionally selected particles, and the average value thereof is set as the average primary particle size.

The average secondary particle size of the active material can be determined from a particle size distribution measured using a laser diffraction particle size analyzer. As a sample for performing the particle size distribution measurement, used is a dispersion liquid, which is obtained by diluting the active material with N-methyl-2-pyrrolidone such that the concentration of the active material becomes 0.1 mass % to 1 mass %. The particle size at which a cumulative volume value is 50% in the obtained particle size distribution is determined as the average secondary particle size.

(Measurement of BET Specific Surface Area)

The BET specific surface area for the active material particle can be obtained by the following method.

First, 4 g of the active material are collected as a sample. Next, the evaluation cell of a measuring apparatus is vacuum dried at a temperature of 100° C. or more for 15 hours to perform degassing. As the evaluation cell, for example, a ½-inch cell, may be used. Next, the sample is placed in the measuring apparatus. As the measuring apparatus, for example, TriStar II 3020 available from Shimadzu-Micromeritics Instrument can be used. Then, in a nitrogen gas at 77K (the boiling point of nitrogen), while gradually increasing a pressure P (mmHg) of the nitrogen gas, the nitrogen gas adsorption amount (mL/g) of the sample is measured for each pressure P. Next, a value obtained by dividing the pressure P (mmHg) by a saturated vapor pressure $P_0$ (mmHg) of the nitrogen gas is defined as a relative pressure $P/P_0$, and a nitrogen gas adsorption amount corresponding to each relative pressure $P/P_0$ is plotted, thereby obtaining an adsorption isotherm. A BET plot is calculated from the nitrogen adsorption isotherm and the BET equation, and the specific surface area is obtained using the BET plot. Note that a BET multipoint method is used to calculate the BET plot.

The active material according to the first embodiment includes a composite oxide having a tetragonal crystal structure and represented by general formula $Li_aTi_bNb_{2-2d}M_{c+2d}O_{2b+5+3c}$. In the above general formula, M is either one selected from the group consisting of W and Mo. Subscripts a, b, c, and d are numbers satisfying $0 \le a \le b+4+3c$, $0 < b < 2-2d$, and $0 < c < 2-4d$. An electrode using the above composite oxide as the electrode active material has high capacity per volume. Moreover, a secondary battery and battery pack using the above composite oxide as electrode active material has high capacity per volume. Namely, the active material exhibits high capacity.

Second Embodiment

According to a second embodiment, an electrode is provided.

The electrode according to the second embodiment includes the active material according to the first embodiment. This electrode may be a battery electrode including the active material according to the first embodiment as an active material for a battery. The electrode as a battery electrode may be, for example, a negative electrode including the active material according to the first embodiment as a negative electrode active material. Alternatively, the electrode may be a positive electrode including the active material according to the first embodiment as a positive electrode active material.

The electrode according to the second embodiment may include a current collector and an active material-containing layer. The active material-containing layer may be formed on both of reverse surfaces or one surface of the current collector. The active material-containing layer may contain the active material, and optionally an electro-conductive agent and a binder.

The active material-containing layer may singly include the active material according to the first embodiment or include two or more species of the active material according to the first embodiment. Furthermore, a mixture where one species of the active material according to the first embodiment or two or more species thereof is further mixed with one species or two or more species of another active material may also be included. The contained proportion of the active material(s) according to the first embodiment with respect to the total mass of the active material(s) according to the first embodiment and the other active material(s) is desirably 10% by mass or more and 100% by mass or less.

For example, in a case where the active material according to the first embodiment is included as the negative electrode active material, examples of other active materials include lithium titanate having a ramsdellite structure (e.g., $Li_{2+x}Ti_3O_7$, $0 \le x \le 3$), lithium titanate having a spinel structure (e.g., $Li_{4+x}Ti_5O_{12}$, $0 \le x \le 3$), monoclinic titanium dioxide ($TiO_2$), anatase titanium dioxide, rutile titanium dioxide, hollandite titanium composite oxide, orthorhombic titanium composite oxides, monoclinic niobium titanium composite oxides, niobium oxides, niobium titanium oxides, niobium molybdenum oxides, and niobium tungsten composite oxides.

Examples of the orthorhombic titanium-containing composite oxide include a compound represented by $Li_{2+e}M2_{2-f}Ti_{6-g}M3_hO_{14+o}$. Here, M2 is at least one selected from the group consisting of Sr, Ba, Ca, Mg, Na, Cs, Rb and K. M3 is at least one selected from the group consisting of Zr, Sn, V, Nb, Ta, Mo, W, Y, Fe, Co, Cr, Mn, Ni and Al. The respective subscripts in the composition formula are specified as follows: $0 \le e \le 6$, $0 \le f < 2$, $0 \le g < 6$, $0 \le h < 6$, and −0.5≤σ≤0.5. Specific examples of the orthorhombic titanium-containing composite oxide include $Li_{2+e}Na_2Ti_6O_{14}$ (0≤e≤6).

Examples of the monoclinic niobium titanium composite oxide include a compound represented by $Li_xTi_{1-y}M4_y$ $Nb_{2-z}M5_zO_{7+δ}$. Here, M4 is at least one selected from the group consisting of Zr, Si, and Sn. M5 is at least one selected from the group consisting of V, Ta, and Bi. The respective subscripts in the composition formula are specified as follows: 0≤x≤5, 0≤y<1, 0≤z<2, and −0.3≤δ≤0.3. Specific examples of the monoclinic niobium titanium composite oxide include $Li_xNb_2TiO_7$ (0≤x≤5).

Another example of the monoclinic niobium titanium composite oxide is a compound represented by $Li_xTi_{1-y}$ $M6_{y+z}Nb_{2-z}O_{7-σ}$. Here, M6 is at least one selected from the group consisting of Mg, Fe, Ni, Co, W, Ta, andMo. The respective subscripts in the composition formula are specified as follows: 0≤x<5, 0≤y<1, 0≤z<2, and −0.3≤δ≤0.3.

The electro-conductive agent is added to improve current collection performance and to suppress the contact resistance between the active material and the current collector. Examples of the electro-conductive agent include carbonaceous substances such as vapor grown carbon fiber (VGCF), carbon blacks such as acetylene black, graphite, carbon nanotubes, and carbon nanofibers. One of these may be used as the electro-conductive agent, or alternatively, stwo or more may be used in combination as the electro-conductive agent. Alternatively, instead of using an electro-conductive agent, a carbon coating or an electro-conductive inorganic material coating may be applied to the surface of the active material particle. In addition, the current collecting performance of the active material-containing layer may be improved by coating carbon or an electro-conductive material onto the active material surface together with using the electro-conductive agent(s).

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), and salts of CMC. One of these may be used as the binder, or alternatively, two or more may be used in combination as the binder.

The blending proportion of active material, electro-conductive agent and binder in the active material-containing layer may be appropriately changed according to the use of the electrode. For example, in the case of using the electrode as a negative electrode of a secondary battery, the active material (negative electrode active material), electro-conductive agent and binder in the active material-containing layer are preferably blended in proportions of 68% by mass to 96% by mass, 2% by mass to 30% by mass, and 2% by mass to 30% by mass, respectively. When the amount of electro-conductive agent is 2% by mass or more, the current collection performance of the active material-containing layer can be improved. When the amount of binder is 2% by mass or more, binding between the active material-containing layer and current collector is sufficient, and excellent cycling performances can be expected. On the other hand, an amount of each of the electro-conductive agent and binder is preferably 30% by mass or less, in view of increasing the capacity.

In the case where the active material surface is covered with carbon or an electro-conductive material, the amount of covering material may be assumed to be included in the amount of electro-conductive agent. The amount of coverage by the carbon or electro-conductive material is preferably 0.5% by mass or more and 5% by mass or less. With a coverage amount within this range, the current-collecting performance and electrode density can be made high.

There may be used for the current collector, a material which is electrochemically stable at the potential (vs. $Li/Li^+$) at which lithium (Li) is inserted into and extracted from the active material. For example in the case where the active material is used as a negative electrode active material, the current collector is preferably made of copper, nickel, stainless steel, aluminum, or an aluminum alloy including one or more elements selected from the group consisting of Mg, Ti, Zn, Mn, Fe, Cu, and Si. The thickness of the current collector is preferably from 5 μm to 20 μm. The current collector having such a thickness can maintain balance between the strength and weight reduction of the electrode.

The current collector may include a portion where the active material-containing layer is not formed on a surface thereof. This portion may serve as an electrode tab.

The electrode may be fabricated by the following method, for example. First, active material, electro-conductive agent, and binder are suspended in a solvent to prepare a slurry. The slurry is applied onto one surface or both of reverse surfaces of a current collector. Next, the applied slurry is dried to form a layered stack of active material-containing layer and current collector. Then, the layered stack is subjected to pressing. The electrode can be fabricated in this manner.

Alternatively, the electrode may also be fabricated by the following method. First, active material, electro-conductive agent, and binder are mixed to obtain a mixture. Next, the mixture is formed into pellets. Then the electrode can be obtained by arranging the pellets on the current collector.

The electrode according to the second embodiment includes the active material according to the first embodiment. Thus, the electrode according to the second embodiment can realize a secondary battery with high capacity per volume.

Third Embodiment

According to a third embodiment, provided is a secondary battery including a negative electrode, a positive electrode, and an electrolyte. The secondary battery includes the electrode according to the second embodiment as the negative electrode, the positive electrode, or both the negative electrode and the positive electrode. Namely, the secondary battery according to the third embodiment includes the electrode that includes the active material according to the first embodiment as battery active material, as a battery electrode. A desirable aspect of the secondary battery includes the electrode according to the second embodiment as the negative electrode. Namely, the desirable aspect of the secondary battery includes the electrode that includes the active material according to the first embodiment as battery active material, as the negative electrode. Hereinafter, the desirable aspect will be explained.

The secondary battery according to the third embodiment may further include a separator disposed between the positive electrode and the negative electrode. The negative electrode, positive electrode, and separator may configure an electrode group. The electrolyte may be held in the electrode group.

The secondary battery according to the third embodiment may further include a container member that houses the electrode group and the electrolyte.

Furthermore, the secondary battery according to the third embodiment may further include a negative electrode terminal electrically connected to the negative electrode and a positive electrode terminal electrically connected to the positive electrode.

The secondary battery according to the third embodiment may be, for example, a lithium secondary battery. Moreover, the secondary battery includes a nonaqueous electrolyte secondary battery including a nonaqueous electrolyte.

Hereinafter, the negative electrode, positive electrode, separator, container member, negative electrode terminal, and positive electrode terminal will be described in detail.

1) Negative Electrode

The negative electrode may include a negative electrode current collector and a negative electrode active material-containing layer. The negative electrode current collector and the negative electrode active material-containing layer may respectively be the current collector and active material-containing layer that may be included in the electrode according to the second embodiment. The negative electrode active material-containing layer includes the active material according to the first embodiment as negative electrode active material.

Of the details of the negative electrode, portions that overlap with the details described in the second embodiment are omitted.

The density of the negative electrode active material-containing layer (excluding the current collector) is preferably 1.8 g/cm$^3$ to 2.8 g/cm$^3$. The negative electrode having the density of the negative electrode active material-containing layer within this range is excellent in energy density and ability of holding the electrolyte. The density of the negative electrode active material-containing layer is preferably 2.1 g/cm$^3$ to 2.6 g/cm$^3$.

The negative electrode may, for example, be fabricated by the same method as for the electrode according to the second embodiment.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one species of compound as the positive electrode active material, or alternatively, include two or more species of compounds in combination. Examples of the oxide and sulfide include compounds capable of having Li and Li ions be inserted and extracted.

Examples of such compounds include manganese dioxide ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y\leq1$, $Li_xCoPO_4$; $0<x<1$), iron sulfate ($Fe_2(SO_4)_3$), vanadium oxides (e.g., $V_2O_5$), and lithium nickel cobalt manganese composite oxide ($Li_xNi_{1-y-z}Co_yMn_zO_2$; $0<x\leq1$, $0<y<1$, $0<z<1$, y+z<1).

Among the above, examples of compounds more preferable as the positive electrode active material include lithium manganese composite oxides having a spinel structure (e.g., $Li_xMn_2O_4$; $0\leq x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxide ($Li_xNi_{1-y-z}Co_yMn_zO_2$; $0<x\leq1$, $0<y<1$, $0<z<1$, y+z<1). The positive electrode potential can be made high by using these positive electrode active materials.

When an ambient temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with ambient temperature molten salts, cycle life can be improved. Details regarding the ambient temperature molten salt are described later.

The primary particle diameter of the positive electrode active material is preferably from 100 nm to 1 μm. The positive electrode active material having a primary particle size of 100 nm or more is easy to handle during industrial production. In the positive electrode active material having a primary particle size of 1 μm or less, in-solid diffusion of lithium ions can proceed smoothly.

The specific surface area of the positive electrode active material is preferably from 0.1 m$^2$/g to 10 m$^2$/g. The positive electrode active material having a specific surface area of 0.1 m$^2$/g or more can secure sufficient sites for inserting and extracting Li ions. The positive electrode active material having a specific surface area of 10 m$^2$/g or less is easy to handle during industrial production, and can secure a good charge-discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluororubber, polyacrylate compounds, imide compounds, carboxymethyl cellulose (CMC), and salts of CMC. One of these may be used as the binder, or alternatively, two or more may be used in combination as the binder.

The electro-conductive agent is added to improve current collection performance and to suppress the contact resistance between the positive electrode active material and the positive electrode current collector. Examples of electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, decomposition of electrolyte can be reduced during storage under high temperatures.

The positive electrode current collector is preferably an aluminum foil, or an aluminum alloy foil containing one or more selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of thereof. This portion may serve as a positive electrode current collecting tab.

The positive electrode may be fabricated by a method similar to that for the electrode according to the second embodiment, using the positive electrode active material.

3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate (LiAsF), lithium trifluoromethanesulfonate ($LiCF_3SO_3$), lithium bistrifluoromethylsulfonylimide ($LiN(CF_3SO_2)_2$), and lithium bis (fluorosulfonyl) imide ($LiN(SO_2F)_2$; LiFSI), and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, an ambient temperature molten salt (ionic melt) including lithium ions, a polymer solid electrolyte, an inorganic solid electrolyte, or the like may be used as the nonaqueous electrolyte.

The ambient temperature molten salt (ionic melt) indicates compounds among organic salts made of combinations of organic cations and anions, which are able to exist in a liquid state at ambient temperature (15° C. to 25° C.). The ambient temperature molten salt includes an ambient temperature molten salt which exists alone as a liquid, an ambient temperature molten salt which becomes a liquid upon mixing with an electrolyte salt, an ambient temperature molten salt which becomes a liquid when dissolved in an organic solvent, and mixtures thereof. In general, the melting point of the ambient temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

Alternatively, in place of the nonaqueous electrolyte, a liquid aqueous electrolyte or gel aqueous electrolyte may be used as the electrolyte. The liquid aqueous electrolyte is prepared by dissolving, for example, the above electrolyte salt(s) as solute in an aqueous solvent. The gel aqueous electrolyte is prepared by obtaining a composite of a liquid aqueous electrolyte and the above polymeric material(s). As the aqueous solvent, a solution including water may be used. The solution including water may be pure water, or may be a mixed solution of water with organic solvent (s).

4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because at a certain temperature, such a porous film melts and can thereby shut off current.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 1% by mass or less.

The shape of the container member is not particularly limited. The shape of the container member may be, for example, flat (thin), square, cylindrical, coin-shaped, and button-shaped. The container member may be appropriately selected depending on battery size and use of the battery.

6) Negative Electrode Terminal

The negative electrode terminal may be made of a material that is electrochemically stable at the Li insertion-extraction potential of the negative electrode active materials mentioned above, and having electrical conductivity. Specific examples of the material for the negative electrode terminal include copper, nickel, stainless steel, aluminum, and aluminum alloy containing at least one selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce contact resistance between the negative electrode terminal and the negative electrode current collector.

7) Positive Electrode Terminal

The positive electrode terminal may be made of, for example, a material that is electrically stable in the potential range of 3 V to 4.5 V (vs. Li/Li$^+$) relative to the oxidation-reduction potential of lithium, and having electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance between the positive electrode terminal and the positive electrode current collector.

In the above, the aspect including the electrode according to the second embodiment as the negative electrode has been explained. Of the aspects of the secondary battery according to the third embodiment, in an aspect including the electrode according to the second embodiment as the positive electrode, as the negative electrode that is the counter electrode thereto, for example, a counter electrode like the following may be used. At least one electrode selected from lithium metal, lithium metal alloy, graphite, silicon, silicon oxide, tin oxide, tin, and other alloys may be used as the negative electrode. A material not including lithium within the active material may be used a negative electrode, by performing pre-doping of Li element thereto.

In the aspect including the electrode according to the second embodiment as the positive electrode, details of the positive electrode overlaps with those explained in the second embodiment, and are therefore omitted.

Next, the secondary battery according to the third embodiment will be more concretely described with reference to the drawings.

Figure 4:
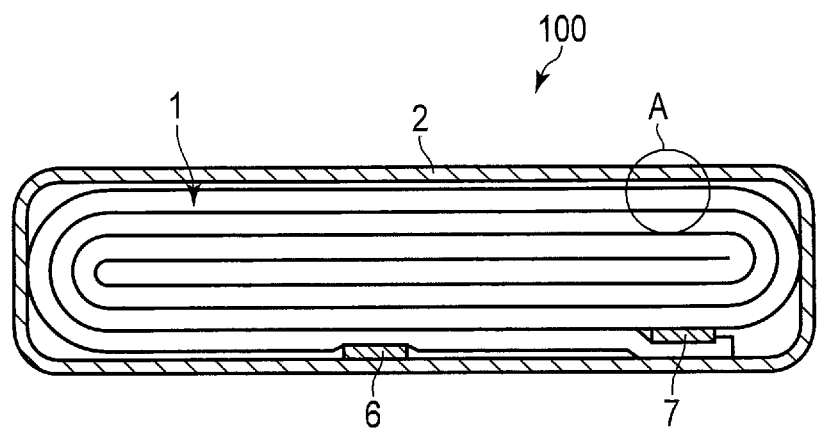
FIG. 4 is a cross-sectional view schematically showing an example of a secondary battery according to an embodiment.
Figure 5:
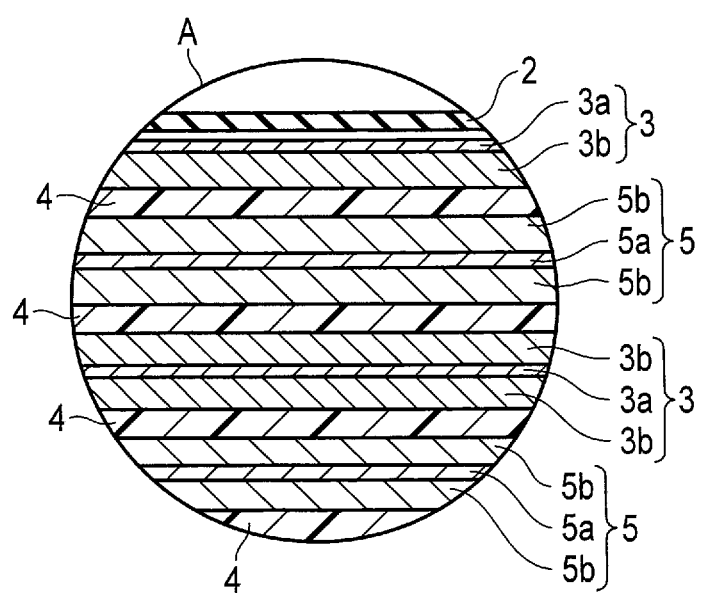
FIG. 5 is an enlarged cross-sectional view of section A of the secondary battery shown in FIG. 4.

FIG. 4 is a cross-sectional view schematically showing an example of a secondary battery according to the third embodiment. FIG. 5 is an enlarged cross-sectional view of section A of the secondary battery shown in FIG. 4.

The secondary battery 100 shown in FIGS. 4 and 5 includes an electrode group 1 shown in FIG. 4, a bag-shaped container member 2 shown in FIGS. 4 and 5, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 4, the electrode group 1 is a wound electrode group in a flat form. The wound electrode group 1 in a flat form includes a negative electrode 3, a separator 4, and a positive electrode 5, as shown in FIG. 5. The separator 4 is sandwiched between the negative electrode 3 and the positive electrode 5.

The negative electrode 3 includes a negative electrode current collector 3*a* and a negative electrode active material-containing layer 3*b*. At the portion of the negative electrode 3 positioned outermost among the wound electrode group 1, the negative electrode active material-containing layer 3*b* is formed only on an inner surface of the negative electrode current collector 3*a*, as shown in FIG. 5. For the other portions of the negative electrode 3, negative electrode active material-containing layers 3*b* are formed on both of reverse surfaces of the negative electrode current collector 3*a*.

The positive electrode 5 includes a positive electrode current collector 5*a* and positive electrode active material-containing layers 5*b* formed on both of reverse surfaces of the positive electrode current collector 5*a*.

As shown in FIG. 4, a negative electrode terminal 6 and positive electrode terminal 7 are positioned in vicinity of the outer peripheral end of the wound electrode group 1. The negative electrode terminal 6 is connected to a portion of the negative electrode current collector 3*a* positioned outermost. The positive electrode terminal 7 is connected to a portion of the positive electrode current collector 5*a* positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 6:
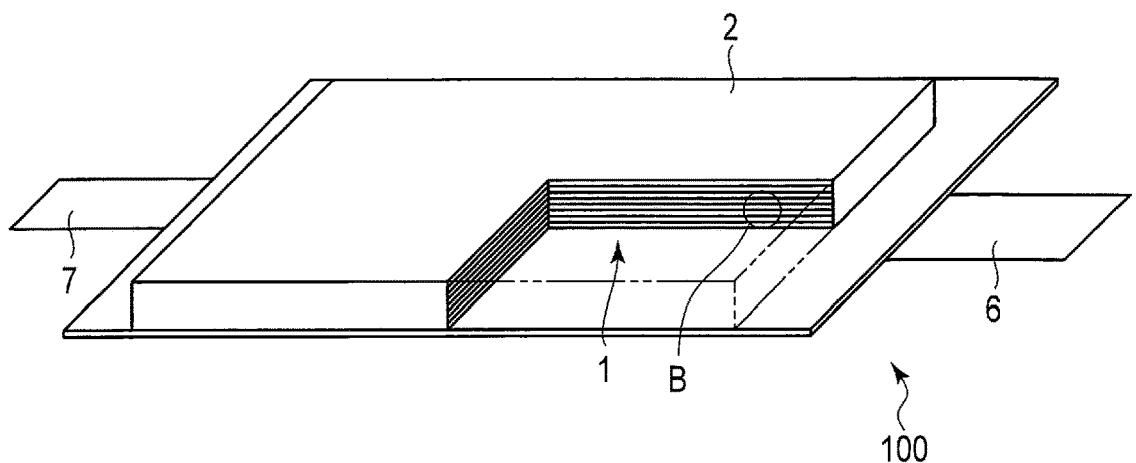
FIG. 6 is a partially cut-out perspective view schematically showing another example of the secondary battery according to an embodiment.
Figure 7:
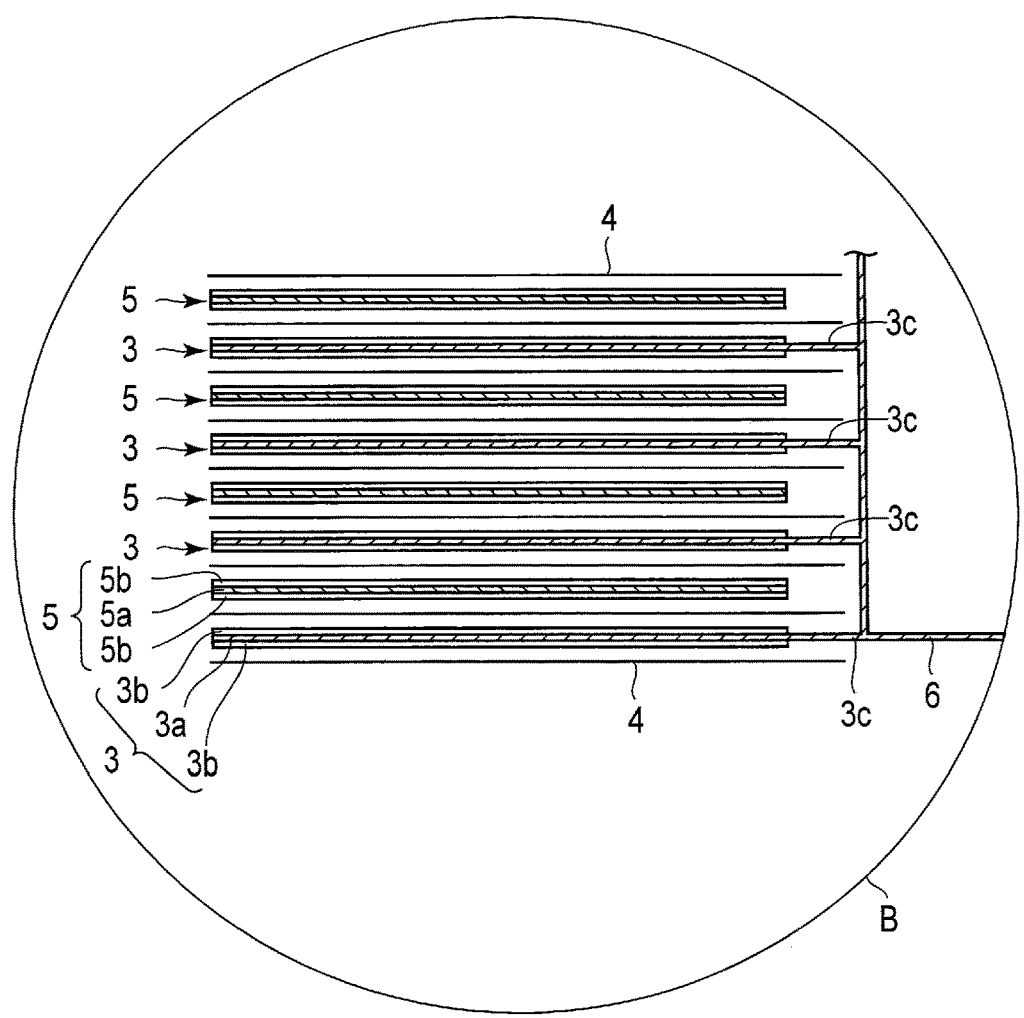
FIG. 7 is an enlarged cross-sectional view of section B of the secondary battery shown in FIG. 6.

The secondary battery according to the third embodiment is not limited to the secondary battery of the structure shown in FIGS. 4 and 5, and may be, for example, a battery of a structure as shown in FIGS. 6 and 7.

FIG. 6 is a partially cut-out perspective view schematically showing another example of the secondary battery according to the third embodiment. FIG. 7 is an enlarged cross-sectional view of section B of the secondary battery shown in FIG. 6.

The secondary battery 100 shown in FIGS. 6 and 7 includes an electrode group 1 shown in FIGS. 6 and 7, a container member 2 shown in FIG. 6, and an electrolyte, which is not shown. The electrode group 1 and electrolyte are housed in the container member 2. The electrolyte is held in the electrode group 1.

The container member 2 is made of a laminate film including two resin layers and a metal layer sandwiched between the resin layers.

As shown in FIG. 7, the electrode group 1 is a stacked electrode group. The stacked electrode group 1 has a structure in which negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3*a* and the negative electrode active material-containing layers 3*b* supported on both surfaces of the negative electrode current collector 3*a*. The electrode group 1 further includes plural positive electrodes 5. Each of the positive electrodes 5 includes the positive electrode current collector 5*a* and the positive electrode active material-containing layers 5*b* supported on both surfaces of the positive electrode current collector 5*a*.

The negative electrode current collector 3*a* of each of the negative electrodes 3 includes at one end, a portion 3*c* where the negative electrode active material-containing layer 3*b* is not supported on either surface. This portion 3c serves as a negative electrode current collecting tab. As shown in FIG. 7, the portions 3c serving as the negative electrode current collecting tabs do not overlap the positive electrodes 5. The plural negative electrode current collecting tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode current collecting tab. Like the negative electrode current collecting tabs (portion 3c), the positive electrode current collecting tabs do not overlap the negative electrodes 3. Further, the positive electrode current collecting tabs are located on the opposite side of the electrode group 1 with respect to the negative electrode current collecting tabs (portion 3c). The positive electrode current collecting tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the third embodiment includes the electrode according to the second embodiment. Namely, the secondary battery according to the second embodiment includes an electrode including the active material according to the first embodiment. Therefore, the secondary battery according to the third embodiment has high capacity per volume.

Fourth Embodiment

According to a fourth embodiment, a battery module is provided. The battery module according to the fourth embodiment includes plural of secondary batteries according to the third embodiment.

In the battery module according to the fourth embodiment, each of the single-batteries may be arranged to be electrically connected in series or in parallel, or may be arranged in combination of in-series connection and in-parallel connection.

An example of the battery module according to the fourth embodiment will be described next, with reference to the drawings.

Figure 8:
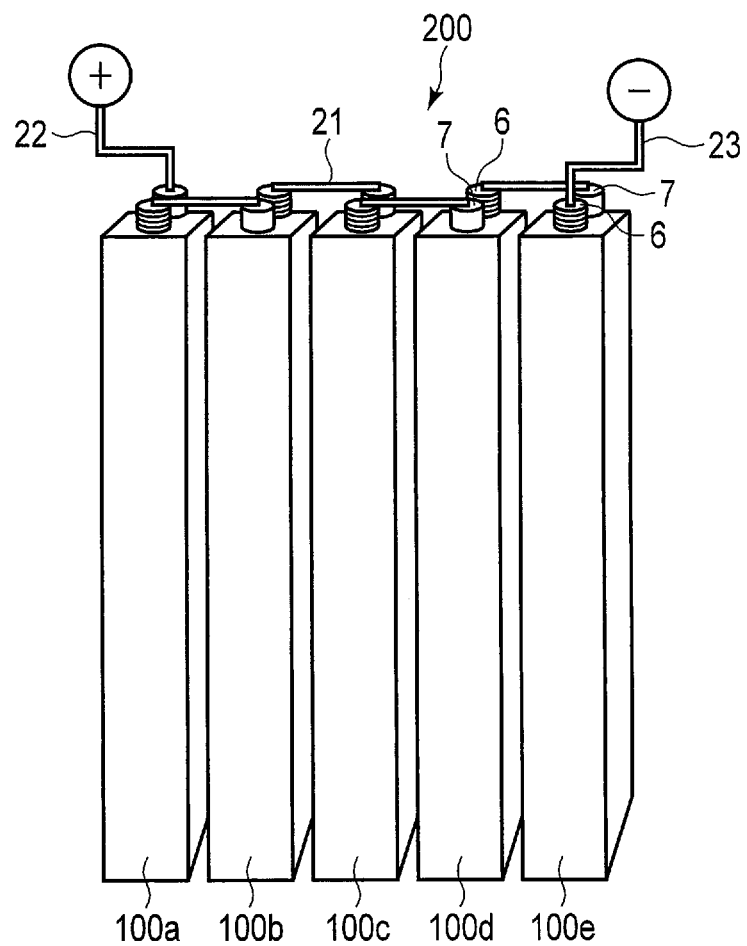
FIG. 8 is a perspective view schematically showing an example of a battery module according to an embodiment.

FIG. 8 is a perspective view schematically showing an example of the battery module according to the fourth embodiment. The battery module 200 shown in FIG. 8 includes five single-batteries 100a to 100e, four bus bars 21, a positive electrode-side lead 22, and a negative electrode-side lead 23. Each of the five single-batteries 100a to 100e is the secondary battery according to the third embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 8 is a battery module of five-in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 7 of at least one battery among the five single-batteries 100a to 100e is electrically connected to the positive electrode-side lead 22 for external connection. In addition, the negative electrode terminal 6 of at least one battery among the five single-batteries 100a to 100e is electrically connected to the negative electrode-side lead 23 for external connection.

The battery module according to the fourth embodiment includes the secondary battery according to the third embodiment. Therefore, the battery module has high capacity per volume.

Fifth Embodiment

According to a fifth embodiment, a battery pack is provided. The battery pack includes a battery module according to the fourth embodiment. The battery pack may include a single secondary battery according to the third embodiment, in place of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, automobiles, and the like) may be used as the protective circuit for the battery pack.

Moreover, the battery pack according to the fifth embodiment may further include an external power distribution terminal. The external power distribution terminal is configured to externally output current from the secondary battery, and/or to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fifth embodiment will be described with reference to the drawings.

Figure 9:
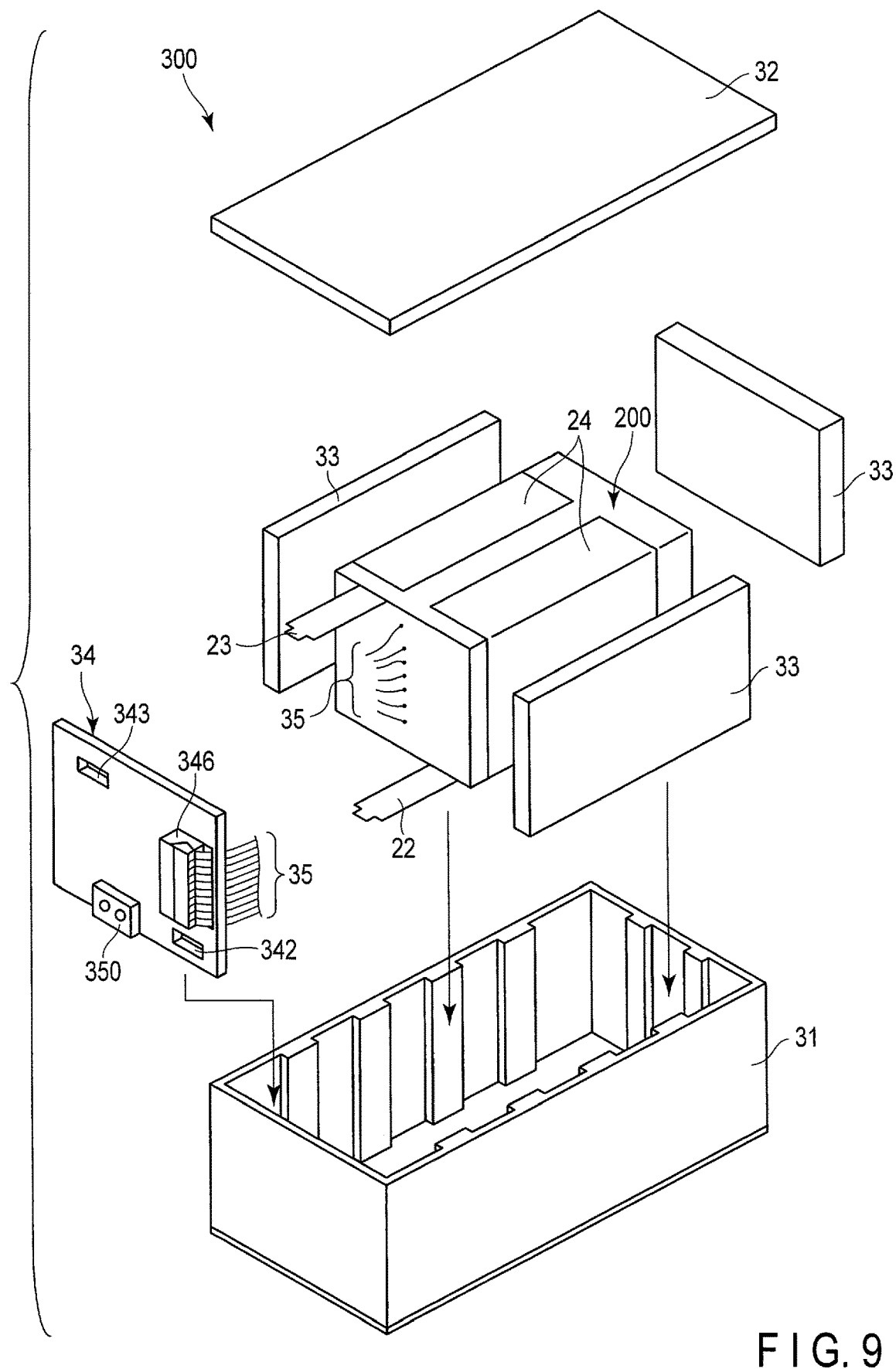
FIG. 9 is an exploded perspective view schematically showing an example of a battery pack according to an embodiment.
Figure 10:
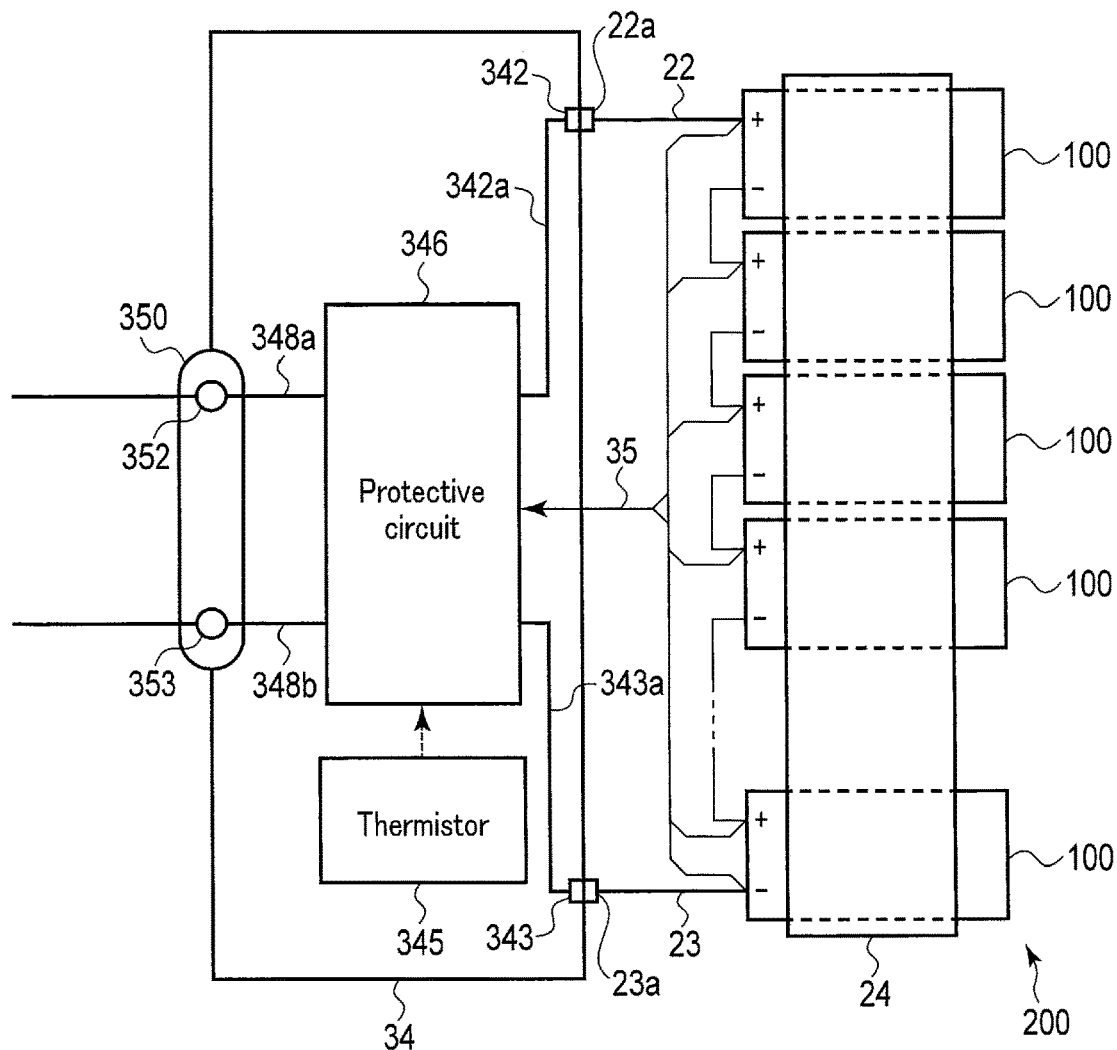
FIG. 10 is a block diagram showing an example of an electric circuit of the battery pack shown in FIG. 9.

FIG. 9 is an exploded perspective view schematically showing an example of the battery pack according to the fifth embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

The housing container 31 shown in FIG. 9 is a square bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a secondary battery according to the third embodiment. The plural single-batteries 100 are electrically connected in series, as shown in FIG. 10. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode (s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side wiring (positive-side wiring) 348a, and a minus-side wiring (negative-side wiring) 348b. One principal surface of the printed wiring board 34 faces one side surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode-side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of overcharge, over-discharge, and overcurrent of the single-battery(s) 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal 352 and negative-side terminal 353 of the external power distribution terminal 350.

Such a battery pack is used, for example, in applications where excellent cycle performance is demanded when a large current is extracted. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fifth embodiment is provided with the secondary battery according to the third embodiment or the battery module according to the fourth embodiment. Accordingly, the battery pack has high capacity per volume.

Sixth Embodiment

According to a sixth embodiment, a vehicle is provided. The battery pack according to the fifth embodiment is installed on this vehicle.

In the vehicle according to the sixth embodiment, the battery pack is configured, for example, to recover regenerative energy from motive force of the vehicle. The vehicle may include a mechanism (a regenerator) configured to convert kinetic energy of the vehicle into regenerative energy.

Examples of the vehicle according to the sixth embodiment include two-wheeled to four-wheeled hybrid electric automobiles, two-wheeled to four-wheeled electric automobiles, electrically assisted bicycles, and railway cars.

In the vehicle according to the sixth embodiment, the installing position of the battery pack is not particularly limited. For example, when installing the battery pack on an automobile, the battery pack may be installed in the engine compartment of the automobile, in rear parts of the vehicle body, or under seats.

The vehicle according to the sixth embodiment may have plural battery packs installed. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

An example of the vehicle according to the sixth embodiment is explained below, with reference to the drawings.

Figure 11:
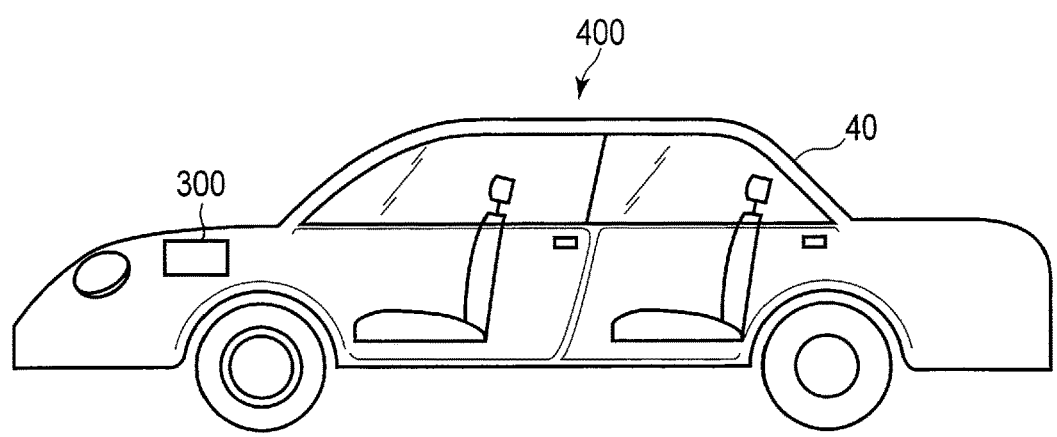
FIG. 11 is a partially see-through diagram schematically showing an example of a vehicle according to an embodiment.

FIG. 11 is a partially see-through diagram schematically showing an example of a vehicle according to the sixth embodiment.

A vehicle 400, shown in FIG. 11 includes a vehicle body 40 and a battery pack 300 according to the fifth embodiment. In the example shown in FIG. 11, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 11, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 12, an aspect of operation of the vehicle according to the sixth embodiment is explained.

FIG. 12 is a diagram schematically showing an example of a control system related to an electric system in the vehicle according to the sixth embodiment. A vehicle 400, shown in FIG. 12, is an electric automobile.

The vehicle 400, shown in FIG. 12, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 12, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit 301a (e.g., a VTM: voltage temperature monitoring). The battery pack 300b includes a battery module 200b and a battery module monitoring unit 301b. The battery pack 300c includes a battery module 200c and a battery module monitoring unit 301c. The battery packs 300a to 300c are battery packs similar to the aforementioned battery pack 300, and the battery modules 200a to 200c are battery modules similar to the aforementioned battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the third embodiment. The battery modules 200a to 200c each perform charging and discharging via a positive electrode terminal 413 and a negative electrode terminal 414.

The battery management unit 411 performs communication with the battery module monitoring units 301a to 301c and collects information such as voltages or temperatures for each of the single-batteries 100 included in the battery modules 200a to 200c included in the vehicle power source 41. In this manner, the battery management unit 411 collects information concerning security of the vehicle power source 41.

The battery management unit 411 and the battery module monitoring units 301a to 301c are connected via the communication bus 412. In the communication bus 412, a set of communication lines is shared at multiple nodes (i.e., the battery management unit 411 and one or more battery module monitoring units 301a to 301c). The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 12) for switching on and off electrical connection between the positive electrode terminal 413 and the negative electrode terminal 414. The switch unit 415 includes a precharge switch (not shown), which is turned on when the battery modules 200a to 200c are charged, and a main switch (not shown), which is turned on when output from the battery modules 200a to 200c is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism (a regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line L1 is connected to the negative electrode terminal 414 of the vehicle power source 41. The other terminal of the connecting line L1 is connected to a negative electrode input terminal 417 of the inverter 44. A current detector (current detecting circuit) 416 in the battery management unit 411 is provided on the connecting line L1 in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44. The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the sixth embodiment is installed with the battery pack according to the fifth embodiment. Since the capacity per volume of the battery pack is high, the degree of liberty in designing the vehicle is high. Thus, various vehicles can be provided without hindering the performance of the vehicle.

EXAMPLES

Hereinafter, the embodiments will be described in more detail based on Examples. It should be noted, however, that the present invention is not limited to the Examples described below.

<Synthesis>

Example 1

A titanium-niobium-tungsten composite oxide having a composition represented by $Ti_2Nb_{10}W_5O_{44}$ and $TiNb_2WO_{10}$ was synthesized, as described below.

As starting materials, titanium oxide, niobium oxide, and tungsten oxide were provided. These starting materials were mixed at a predetermined composition ratio, and subjected to a dry pulverizing and mixing treatment. The obtained mixture was then put in a crucible made of alumina and was fired at 1200° C. for 12 hours in air, followed by cooling in the furnace. The fired product was subjected to dry pulverization, and the pulverized products were subjected to sieving to adjust the particle size. Through the above procedure, an oxide powder was obtained.

Example 2

A titanium-niobium-tungsten composite oxide having a composition represented by $Ti_2Nb_{10}W_5O_{44}$ and $TiNb_2WO_{10}$ was synthesized, as described below.

An oxide powder was synthesized by the same method as that described in Example 1, except that the composition ratio of titanium oxide, niobium oxide, and tungsten oxide was changed according to a target composition and the firing temperature was changed to 1150° C.

Example 3

A titanium-niobium-molybdenum composite oxide having a composition represented by $TiNb_5Mo_2O_{20}$ was synthesized, as described below.

As starting materials, niobium ammonium oxalate, ammonium molybdate, and titanium tetraisopropoxide were provided. These starting materials were weighed at a predetermined composition ratio. Niobium ammonium oxalate and ammonium molybdate were dissolved in pure water to thereby prepare a solution A. Next, titanium tetraisopropoxide was put into an aqueous solution of oxalic acid having a concentration of 1 M and was dissolved therein by heating and stirring, to thereby prepare a solution B. After the solution A and the solution B were mixed, an ammonia solution was added while heating and stirring to adjust the pH to 7, whereby a sol was obtained. After adjusting the pH, the solvent was evaporated while heating and stirring, whereby a gel was obtained. The gel was then put into a drying furnace having a temperature of 100° C. and dried. After drying the gel, an obtained solid material was pulverized to obtain a white precursor powder. The precursor powder was put into an alumina crucible, and the crucible was covered to suppress vaporization of molybdenum, then firing was performed at 800° C. for four hours. The fired product was then subjected to dry pulverization, and the pulverized products were subjected to sieving to adjust the particle size. Through the above procedure, an active material powder was obtained.

Example 4

Up until the pulverization after drying the gel, the same procedure as that described in Example 3 was performed, to obtain a white precursor powder. Potassium oxide ($K_2O$) was added to the precursor powder so that the added amount of K (in terms of raw material) would be 10000 ppm with respect to an estimated synthesis amount that would be obtained after firing of the active material powder. Then, dry mixing and pulverizing were performed. The precursor powder was put into an alumina crucible, and the crucible was covered to suppress vaporization of molybdenum, then firing was performed at 750° C. for four hours. The fired product was then subjected to dry pulverization, and the pulverized products were subjected to sieving to adjust the particle size. Through the above procedure, an active material powder was obtained.

Example 5

Starting materials were mixed at the same mixing ratio as that described in Example 2, and iron oxide ($Fe_2O_3$) was further added to the resulting mixture so that the amount of added Fe would be 2000 ppm with respect to an estimated synthesis amount that would be obtained after firing of the active material powder. Material production was carried out under the same production conditions as those described in Example 2 to obtain an active material powder.

Example 6

Up until the pulverization after drying the gel, the same procedure as that described in Example 3 was performed, to obtain a white precursor powder. Phosphorus oxide ($P_2O_5$) was added to the precursor powder so that the added amount of P (in terms of raw material) would be 2000 ppm with respect to an estimated synthesis amount that would be obtained after firing of the active material powder. Then, dry mixing and pulverization were performed. Thereafter, material synthesis was carried out under the same conditions as those described in Example 3 to obtain an active material powder.

Example 7

Starting materials were mixed at the same mixing ratio as that described in Example 2, and molybdenum oxide ($MoO_3$) was further added to the resulting mixture so that the amount of added Mo would be 8000 ppm with respect to an estimated synthesis amount that would be obtained after firing of the active material powder. Thereafter, material synthesis was carried out under the same conditions as those described in Example 2, except that the firing temperature was changed to 1100° C., whereby an active material powder was obtained.

Example 8

Starting materials were mixed at the same mixing ratio as that described in Example 1, and zirconium oxide ($ZrO_2$) was further added to the resulting mixture so that the amount of added Zr would be 2000 ppm with respect to an estimated synthesis amount that would be obtained after firing of the active material powder. Thereafter, material synthesis was carried out under the same conditions as those described in Example 1 to obtain an active material powder.

Comparative Example 1

A titanium-niobium composite oxide having a composition represented by $TiNb_2O_7$ was synthesized, as follows.

As starting materials, titanium oxide and niobium oxide were provided. These starting materials were mixed at a predetermined composition ratio, and the resulting mixture was subjected to a dry pulverization and mixing treatment. Then, the obtained mixed powder was put into a crucible made of alumina and was fired at 1100° C. for 12 hours in air, followed by cooling in the furnace. The fired product was subjected to dry pulverization, and the pulverized products were subjected to sieving to adjust the particle size. Through the above procedure, an oxide powder was obtained.

Examples 9 to 12

Titanium-niobium-molybdenum composite oxides having compositions represented by $Ti_4Nb_{10}Mo_4O_{45}$, $Ti_2Nb_{10}Mo_2O_{35}$, $Ti_5Nb_{10}Mo_7O_{55}$, and $Ti_7Nb_{10}Mo_7O_{60}$ were synthesized by performing the same procedure as that described in Example 3, except that the composition ratio of the starting materials was changed. Through the above procedure, active material powders were obtained.

<Measurement>

Powders respectively obtained in the above Examples and Comparative Example were subjected to wide-angle X-ray scattering measurement. The measurement was performed according to the details described above. Based on the obtained spectra, an analysis of the crystal structures was performed according to the Rietveld method.

Figure 15:
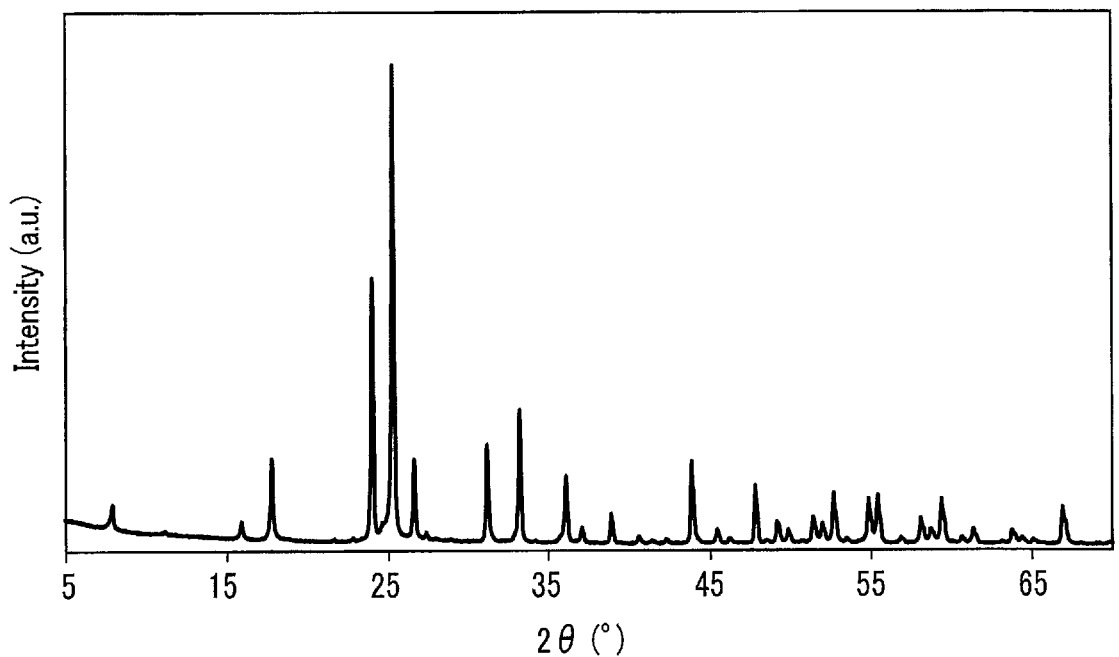
FIG. 15 is a graph showing a spectrum obtained through wide-angle X-ray scattering measurement of an active material composite oxide in Example 3.
Figure 16:
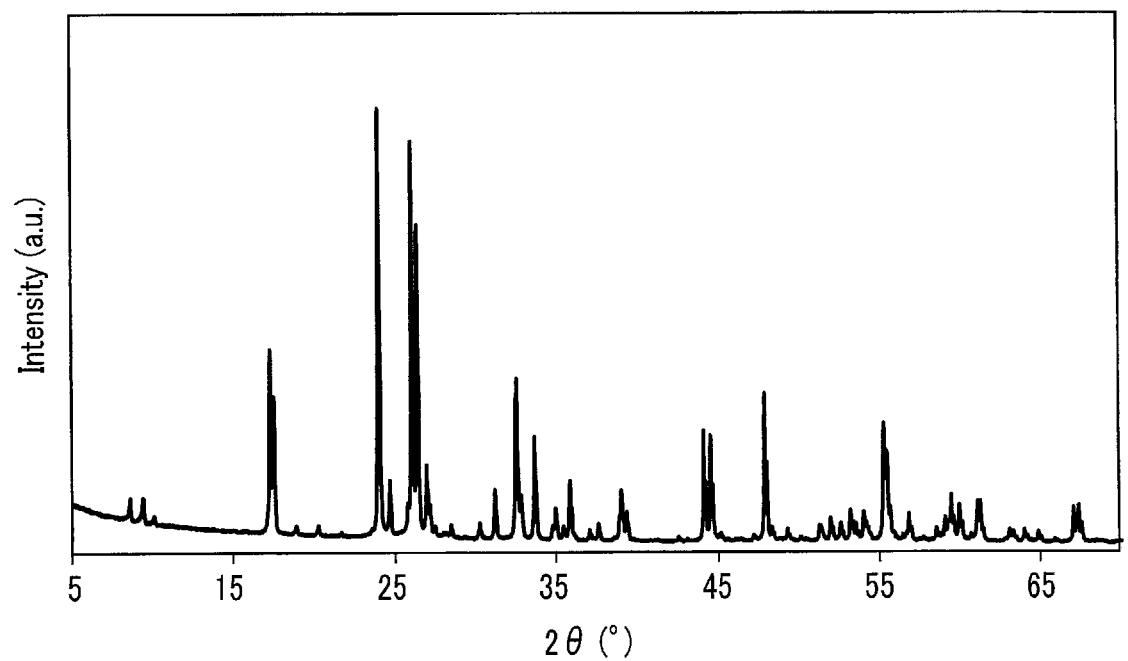
FIG. 16 is a graph showing a spectrum obtained through wide-angle X-ray scattering measurement of an active material composite oxide in Comparative Example 1.

A part of the respective spectra obtained is shown in FIGS. 13 to 16. FIG. 13 shows a spectrum of the composite oxide obtained in Example 1. FIG. 14 shows a spectrum of the composite oxide obtained in Example 2. FIG. 15 shows a spectrum of the composite oxide obtained in Example 3. FIG. 16 shows a spectrum of the composite oxide obtained in Comparative Example 1.

As a result of the structural analysis, the composite oxide obtained in Example 1 was identified as having a crystal structure in which two phases of crystal structures corresponding to the crystal structures shown in FIGS. 1 and 2, respectively, coexisted. Specifically, the following two phases of crystal structures were used as estimation models: a crystal structure which belongs to I-4 as the notation of space group (space group No. 82), has a rhenium oxide-type block structure of 4×4=16 that includes a structure sharing vertices with tetrahedra, and has a ratio $A_O/A_M$ of 2.59 as a ratio of the number of oxygen to the number of metal elements per unit lattice; and a crystal structure which belongs to I-4 as the notation of space group (space group No. 82), has a rhenium oxide-type block structure that includes no tetrahedral structure, and has a ratio $A_O/A_M$ of 2.50 as a ratio of the number of oxygen to the number of metal elements per unit lattice. The phases were identified as the above-described crystal structures because, when such crystal structures were used as estimation models, fitting was performed with the value of the reliability factor $R_{wp}$ according to the Rietveld method becoming 9.86% for all the peaks that appeared at 5° to 70° excluding heterogeneous phases, and the position and relative intensity of the peaks were confirmed to have no contradiction.

The compositions of the respective phases were determined as $Ti_2Nb_{10}W_5O_{44}$ and $TiNb_2W_{10}$, and these respective compositions were included at a composition ratio of 2:1.

As a result of the structural analysis, the composite oxide obtained in Example 2 was identified as having a crystal structure in which two phases of crystal structures corresponding to the crystal structures shown in FIGS. 1 and 2, respectively, coexisted. Specifically, the following two phases of crystal structures were used as estimation models: a crystal structure which belongs to I-4 as the notation of space group (space group No. 82), has a rhenium oxide-type block structure of 4×4=16 that includes a structure sharing vertices with tetrahedra, and has a ratio $A_O/A_M$ of 2.59 as a ratio of the number of oxygen to the number of metal elements per unit lattice; and a crystal structure which belongs to I-4 as the notation of space group (space group No. 82), has a rhenium oxide-type block structure that includes no tetrahedral structure, and has a ratio $A_O/A_M$ of 2.50 as a ratio of the number of oxygen to the number of metal elements per unit lattice. The phases were identified as the above-described crystal structures because, when such crystal structures were used as estimation models, fitting was performed with the value of the reliability factor $R_{wp}$ according to the Rietveld method becoming 13.78% for all the peaks that appeared at 5° to 70° excluding heterogeneous phases, and the position and relative intensity of the peaks were confirmed to have no contradiction.

The compositions of the respective phases were determined as $Ti_2Nb_{10}W_5O_{44}$ and $TiNb_2WO_{10}$, and these respective compositions were included at a composition ratio of 1:9.

As a result of the structural analysis, the composite oxide obtained in Example 3 was identified as having a crystal structure corresponding to the crystal structure shown in FIG. 3. Specifically, a crystal structure which belongs to I-4 as the notation of space group (space group No. 82), has a rhenium oxide-type block structure of 3×3=9 that includes a structure sharing vertices with tetrahedra, and has a ratio $A_O/A_M$ of 2.56 as a ratio of the number of oxygen to the number of metal elements per unit lattice was used as an estimation model. The crystal was identified as the above-described crystal structure because, when such a crystal structure was used as an estimation model, fitting was performed with the value of the reliability factor $R_{wp}$ according to the Rietveld method becoming 9.92% for all the peaks that appeared at 5° to 70° excluding heterogeneous phases, and the position and relative intensity of the peaks were confirmed to have no contradiction.

As a result of the structural analysis, the composite oxide obtained in Comparative Example 1 was identified as having a monoclinic crystal structure. Specifically, a crystal structure which belongs to C2/m as the notation of space group (space group No. 12), does not include a structure sharing vertices with tetrahedra, has a rhenium oxide-type block structure of 3×3=9, and has a ratio $A_O/A_M$ of 2.33 as a ratio of the number of oxygen to the number of metal elements per unit lattice was used as an estimation model. The crystal was identified as the crystal structure because, when such a crystal structure was used as anestimation model, fitting was performed with the value of the reliability factor $R_{wp}$ according to the Rietveld method becoming 4.36% for all the peaks that appeared at 5° to 70° excluding heterogeneous phases, and the position and relative intensity of the peaks were confirmed to have no contradiction.

<Evaluation of Battery Performance>

The powders of the respective composite oxides obtained in the above Examples and the Comparative Example were used as active materials to produce electrodes, as described below.

First, 100 parts by mass of active material, 6 parts by mass of electro-conductive agent, and 4 parts by mass of binder were dispersed in a solvent to prepare a slurry. Each of the composite material powders obtained by the above method was used as the active material. A mixture of acetylene black and carbon nanotube as well as graphite was used as the electro-conductive agent. A mixture of carboxymethyl cellulose (CMC) and styrene-butadiene rubber (SBR) was used as the binder. Pure water was used as the solvent.

Then, the obtained slurry was applied onto one surface of a current collector and the coating was dried, to form an active material-containing layer. An aluminum foil having a thickness of 12 μm was used as the current collector. Subsequently, the current collector and the active material-containing layer were pressed. An electrode was thus obtained. The mass per unit area of the electrode was 60 g/m².

A nonaqueous electrolyte was prepared as follows. An electrolyte salt was dissolved in an organic solvent to obtain a liquid nonaqueous electrolyte. $LiPF_6$ was used as the electrolyte salt. The molar concentration of $LiPF_6$ in the nonaqueous electrolyte was 1 mol/L. A mixed solvent of ethylene carbonate (EC) and diethyl carbonate (DEC) was used as the organic solvent. A volume ratio of EC and DEC was 1:2.

Three-electrode beaker cells were produced using the electrode obtained by the above-described method as a working electrode, using a metal lithium foil as a counter electrode and a reference electrode, and using the nonaqueous electrolyte prepared by the above-described method.

The cycle performance of the respective cells produced was evaluated. Specifically, the cells were first charged at a charge current of 0.2 C at a temperature of 25° C. until the battery voltage reached 0.7 V. The cells were then discharged at a discharge current of 0.2 C until the battery voltage reached 3.0 V. Charge and discharge capacities at this time were measured, and a value of the capacity per volume of the electrode active material-containing layer (excluding the current collector) was calculated for each of the charge and discharge. Also, charge-discharge efficiency of the above initial charge-discharge was calculated (Initial Charge-discharge Efficiency=[(Initial Discharge Capacity/Initial Charge Capacity)×100%]).

Graphs showing initial charge and discharge curves for some of the beaker cells are shown in FIGS. 17 to 19. FIG. 17 shows charge and discharge curves of the cell which used the composite oxide obtained in Example 1 with solid lines (charge curve 51 and discharge curve 61). FIG. 17 also shows charge and discharge curves of the cell which used the composite oxide obtained in Comparative Example 1 with broken lines (charge curve 50 and discharge curve 60). FIG. 18 shows charge and discharge curves of the cell which used the composite oxide obtained in Example 2 with solid lines (charge curve 52 and discharge curve 62). FIG. 19 shows charge and discharge curves of the cell which used the composite oxide obtained in Example 3 with solid lines (charge curve 53 and discharge curve 63). FIGS. 18 and 19 also show charge and discharge curves of the cell which used the composite oxide obtained in Comparative Example 1 with broken lines (charge curve 50 and discharge curve 60).

Tables 1 and 2 below shows the details of the compositions and the crystal structures of the composite oxides synthesized in the Examples and Comparative Example, as well as the performance thereof as active materials for a battery. Specifically, as the details of the composite oxides, Table 1 shows the compositions of the composite oxides, the crystal structures thereof, the number of rhenium oxide-type blocks per unit lattice in the crystal structures, the ratio ($A_O/A_M$ ratio) of the number of oxygen ($A_O$) to the number of metal elements ($A_M$) per unit lattice, the peak intensity ratio I2/I1 of the X-ray diffraction spectrum, and the species of additive elements. When there is no additive element, the section of "Additive Element" is indicated as "(none)". As the performance as an active material for a battery, Table 1 shows the charge capacity and discharge capacity per volume, and the initial charge-discharge efficiency. In Comparative Example 1, no peak was obtained in the range of 2θ=25.1±0.5° in the spectrum, as shown in FIG. 16, which made it impossible to calculate the I2/I1 ratio. Thus, the section of I2/I1 ratio of Comparative Example 1 is indicated as "-" (not applicable).

As for the compositions of the composite oxides shown in Table 1, formulas are shown which were obtained by multiplying chemical formulas by a certain coefficient so that the numerical values showing the stoichiometric proportion of the constituent elements would be integers. For example, in regard to Example 1 and Example 2, the composition of one of the phases is represented by $Ti_2Nb_{10}W_5O_{44}$, which is equal to a formula obtained by multiplying the chemical formula $Ti_{0.4}Nb_2WO_{8.8}$ by a coefficient of 5. Namely, the composite oxides synthesized in Example 1 and Example 2 include a phase corresponding to a compound represented by $Li_aTi_bNb_{-2d}M_{c+2d}O_{2b+5+3c}$, for which M is W, a=0, b=0.4, c=1, and d=0. The composition $TiNb_2WO_{10}$ of the other phase corresponds to the general formula $Li_aTi_bNb_{2-2d}M_{c+2d}O_{2b+5+3c}$, without conversion, the coefficient being 1. $TiNb_5Mo_2O_{20}$ of Example 3 is equal to a formula obtained by multiplying the chemical formula $Ti_{1/3}Nb_{5/3}Mo_{2/3}O_{20/3}$ by a coefficient of 3. Namely, the composite oxide synthesized in Example 3 corresponds to a compound represented by $Li_aTi_bNb_{-2d}M_{c+2d}O_{2b+5+3c}$, for which M is Mo, a=0, b=1/3, c=1/3, and d=1/6. In regard to Comparative Example 1, the composition corresponds to the general formula $Li_aTi_bNb_{-2d}M_{c+2d}O_{2b+5+3c}$, without conversion, the coefficient being 1. For Examples 4 to 8, compositions not including the additive element or substituting element in minute amounts are shown. The compositions of the composite oxides of Examples 4 to 8 correspond to the general formula $Li_aTi_bNb_{2-2d}M_{c+2d}O_{2b+5+3c}$, in the same manner as with the composition of any of the composite oxides of Examples 1 to 3.

TABLE 1

| | Composition (Composition Ratio) | Crystal Structure | Number of Rhenium Oxide-type Blocks per Unit Lattice | $A_O/A_M$ ratio | I2/I1 ratio | Additive Element |
|---|---|---|---|---|---|---|
| Example 1 | $Ti_2Nb_{10}W_5O_{44}:TiNb_2WO_{10}$ (2:1) | tetragonal | 16 | 2.59; 2.50 | 0.13 | (none) |
| Example 2 | $Ti_2Nb_{10}W_5O_{44}:TiNb_2WO_{10}$ (1:9) | tetragonal | 16 | 2.59; 2.50 | 0.60 | (none) |
| Example 3 | $TiNb_5Mo_2O_{20}$ | tetragonal | 9 | 2.50 | 0.48 | (none) |
| Example 4 | $TiNb_5Mo_2O_{20}$ | tetragonal | 9 | 2.50 | 0.46 | K |
| Example 5 | $Ti_2Nb_{10}W_5O_{44}:TiNb_2WO_{10}$ (1:9) | tetragonal | 16 | 2.59; 2.50 | 0.60 | Fe |
| Example 6 | $TiNb_5Mo_2O_{20}$ | tetragonal | 9 | 2.50 | 0.50 | P |
| Example 7 | $Ti_2Nb_{10}W_5O_{44}:TiNb_2WO_{10}$ (1:9) | tetragonal | 16 | 2.59; 2.50 | 0.55 | Mo |
| Example 8 | $Ti_2Nb_{10}W_5O_{44}:TiNb_2WO_{10}$ (2:1) | tetragonal | 16 | 2.59; 2.50 | 0.20 | Zr |
| Comparative Example 1 | $TiNb_2O_7$ | monoclinic | 9 | 2.33 | — | (none) |

| | Charge Capacity (mAh/cm³) | Discharge Capacity (mAh/cm³) | Initial Charge-discharge Efficiency (%) |
|---|---|---|---|
| Example 1 | 943.4 | 868.5 | 92.1 |
| Example 2 | 1038.9 | 947.3 | 91.2 |
| Example 3 | 1022.6 | 883.5 | 86.4 |
| Example 4 | 1144.4 | 987.6 | 86.3 |
| Example 5 | 1042.26 | 949.5 | 91.1 |
| Example 6 | 1141.3 | 984.9 | 86.3 |
| Example 7 | 1082.5 | 986.2 | 91.1 |
| Example 8 | 1058.8 | 974.1 | 92.0 |
| Comparative Example 1 | 867.9 | 806.6 | 92.9 |

Regarding the compositions of the composite oxides shown in Table 2 as well, formulas obtained by multiplying chemical formulas by a certain coefficient are shown. $Ti_4Nb_{10}Mo_4O_{45}$ of Example 9 corresponds to a compound wherein the coefficient is 5, M is Mo, a=0, b=0.8, c=0.8, and d=0. $Ti_2Nb_{10}Mo_2O_{35}$ of Example 10 corresponds to a compound wherein the coefficient is 5, M is Mo, a=0, b=0.4, c=0.4, and d=0. $Ti_5Nb_{10}Mo_7O_{55}$ of Example 11 corresponds to a compound wherein the coefficient is 6, M is Mo, a=0, b=5/6, c=5/6, and d=1/6. $Ti_7Nb_{10}Mo_7O_{60}$ of Example 12 corresponds to a compound wherein the coefficient is 5, M is Mo, a=0, b=7/5, c=7/5, and d=0.

TABLE 2

| | Composition | Crystal Structure | Number of Rhenium Oxide-type Blocks per Unit Lattice | $A_O/A_M$ ratio | I2/I1 ratio | Additive Element |
|---|---|---|---|---|---|---|
| Example 9 | $Ti_4Nb_{10}Mo_4O_{45}$ | tetragonal | 9 | 2.50 | 0.67 | (none) |
| Example 10 | $Ti_2Nb_{10}Mo_2O_{35}$ | tetragonal | 9 | 2.50 | 0.63 | (none) |
| Example 11 | $Ti_5Nb_{10}Mo_7O_{55}$ | tetragonal | 9 | 2.50 | 0.68 | (none) |
| Example 12 | $Ti_7Nb_{10}Mo_7O_{60}$ | tetragonal | 9 | 2.50 | 0.83 | (none) |

| | Charge Capacity (mAh/cm³) | Discharge Capacity (mAh/cm³) | Initial Charge-discharge Efficiency (%) |
|---|---|---|---|
| Example 9 | 987.0 | 853.7 | 86.5 |
| Example 10 | 978.2 | 845.2 | 86.4 |
| Example 11 | 973.0 | 839.7 | 86.3 |
| Example 12 | 969.4 | 834.6 | 86.1 |

Whereas the composite oxides of the active materials obtained in Examples 1 to 12 corresponded to the above-described compound represented by the general formula $Li_aTi_bNb_{2-2d}M_{c+2d}O_{2b+5+3c}$ (M=W, MO; 0≤a≤b+4+3c, 0<b<2−2d, 0<c<2−4d; irrespective of the presence or absence of additive element), the composite oxide obtained in Comparative Example 1 did not satisfy this general formula. As shown in Tables 1 and 2, the active materials of Examples 1 to 12 exhibited a high charge capacity and a high discharge capacity as compared with the composite oxide of Comparative Example 1. In addition, the initial charge-discharge efficiency achieved using the active materials of Examples 1 to 12 was comparable to that achieved using the active material of Comparative Example 1.

Therefore, it is recognized that a composite oxide having a tetragonal crystal structure and represented by the above general formula $Li_aTi_bNb_{2-2d}M_{c+2d}O_{2b+5+3c}$ (M is W or Mo; 0≤a≤b+4+3c, 0<b<2−2d, 0<c<2−4d) exhibits favorable initial charge-discharge efficiency as an electrode active material, and has high charge and discharge capacities per volume.

According to one or more embodiment and example described above, an active material including a composite oxide is provided. The composite oxide has a tetragonal crystal structure, and is represented by general formula $Li_aTi_bNb_{2-2d}M_{c+2d}O_{2b+5+3c}$. Here, M in the formula is any one selected from the group consisting of W and Mo. Each subscript in the formula satisfy relationships of 0≤a≤b+4+3c, 0<b<2−2d, and 0<c<2−4d. The active material can provide an electrode that can realize a high capacity secondary battery, a high capacity secondary battery and battery pack, and a vehicle installed with the battery pack.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. An active material, comprising:
a composite oxide of formula:

$$Li_aTi_bNb_{2-2d}M_{c+2d}O_{2b+5+3c},$$

wherein
M is one selected from the group consisting of W and Mo,
0≤a≤b+4+3c,
0<b<2−2d, and
0<c<2−4d, and
wherein the composite oxide is of a tetragonal crystal structure.

2. The active material according to claim 1, wherein M is W, and the tetragonal crystal structure of the composite oxide comprises a rhenium oxide block structure having an octahedral structure configured of oxygen and a metal element and being configured by 16 of the octahedral structures sharing vertices.

3. The active material according to claim 1, wherein M is Mo, and the tetragonal crystal structure of the composite oxide comprises a rhenium oxide-block structure having an octahedral structure configured of oxygen and a metal element and being configured by 9 of the octahedral structures sharing vertices.

4. The active material according to claim 1, further comprising at least one element selected from the group consisting of Ti V, Ta, Fe, Bi, Sb, As, P, Cr, Mo, W, B, Na, K, Mg, Al, Ca, Y, Zr, and Si.

5. The active material according to claim 1, wherein in a diffraction spectrum according to powder X-ray diffraction using a Cu-Kα ray source, a peak intensity of a peak having highest intensity appearing in a range of 2θ=25.1±0.5° and a peak intensity I2 of a peak appearing in a range of 2θ=23.8±0.5° satisfy a relationship of 0.1≤I2/I1≤1.0.

6. An electrode comprising the active material according to claim 1.

7. The electrode according to claim 6, comprising an active material-containing layer, the active material-containing layer containing the active material.

8. A secondary battery comprising:
a positive electrode;
a negative electrode; and
an electrolyte,
the negative electrode comprising the electrode according to claim 6.

9. A secondary battery comprising:
a positive electrode;
a negative electrode; and
an electrolyte,
the positive electrode comprising the electrode according to claim 6.

10. A battery pack comprising the secondary battery according to claim 8.

11. The battery pack according to claim 10, further comprising an external power distribution terminal and a protective circuit.

12. The battery pack according to claim 10, comprising plural of the secondary battery, the secondary batteries being electrically connected in series, in parallel, or in combination of in-series connection and in-parallel connection.

13. A vehicle comprising the battery pack according to claim 10.

14. The vehicle according to claim 13, wherein the vehicle comprises a mechanism configured to convert kinetic energy of the vehicle into regenerative energy.

15. The active material according to claim 4, wherein an amount of the at least one element is 10 ppm to 10000 ppm in terms of mass with respect to the composite oxide of formula $Li_a Ti_b Nb_{2-2d} M_{c+2d} O_{2b+5+3c}$.

* * * * *